(12) United States Patent
Akiyama

(10) Patent No.: US 10,760,534 B2
(45) Date of Patent: Sep. 1, 2020

(54) FUEL VAPOR PROCESSING APPARATUS

(71) Applicant: AISAN KOGYO KABUSHIKI KAISHA, Obu-shi, Aichi-ken (JP)

(72) Inventor: Takanori Akiyama, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 64 days.

(21) Appl. No.: 15/760,266

(22) PCT Filed: Aug. 31, 2016

(86) PCT No.: PCT/JP2016/075442
§ 371 (c)(1),
(2) Date: Mar. 15, 2018

(87) PCT Pub. No.: WO2017/056833
PCT Pub. Date: Apr. 6, 2017

(65) Prior Publication Data
US 2019/0048830 A1    Feb. 14, 2019

(30) Foreign Application Priority Data
Oct. 1, 2015    (JP) .................................. 2015-196068

(51) Int. Cl.
*F02M 25/08*        (2006.01)
*F02B 37/00*        (2006.01)
(Continued)

(52) U.S. Cl.
CPC ........... *F02M 25/089* (2013.01); *F02B 37/00* (2013.01); *F02M 25/08* (2013.01);
(Continued)

(58) Field of Classification Search
CPC .. F02M 25/0836; F02M 25/08; F02M 25/089; F02M 35/10; F02B 37/00; F04F 5/46; F04F 5/54; Y02T 10/144
See application file for complete search history.

(56) References Cited

U.S. PATENT DOCUMENTS

2014/0245997 A1    9/2014    Zhelyaskov et al.
2015/0083094 A1    3/2015    Pursifull
(Continued)

FOREIGN PATENT DOCUMENTS

JP    H04237860 A    8/1992
JP    H10331728 A    12/1998
(Continued)

OTHER PUBLICATIONS

PCT/JP2016/075442 International Search Report and Written Opinion dated Nov. 15, 2016 (7 p.).
(Continued)

*Primary Examiner* — Hoang M Nguyen
(74) *Attorney, Agent, or Firm* — Conley Rose, P.C.

(57) ABSTRACT

A fuel vapor processing apparatus form an internal combustion engine provided with a turbocharger includes a canister and an ejector. The canister is configured to adsorb fuel vapor from a fuel tank. The ejector is configured to generate a negative pressure by supercharged air flowing from an intake passage on a downstream side of the turbocharger to the intake passage on an upstream side of the turbocharger, so that fuel vapor in the canister is purged by the negative pressure. The ejector includes an ejector housing extending in a discharge direction of the supercharged air. The ejector housing is welded to a tubular member defining a passage wall of the intake passage such that the supercharged air is discharged into the intake passage on the upstream side of the turbocharger and that the discharge direction of the
(Continued)

supercharged air is parallel to a direction of flow of intake air.

21 Claims, 20 Drawing Sheets

(51) Int. Cl.
    *F02M 35/10*     (2006.01)
    *F04F 5/46*     (2006.01)
    *F04F 5/54*     (2006.01)

(52) U.S. Cl.
    CPC ........ *F02M 25/0836* (2013.01); *F02M 35/10* (2013.01); *F04F 5/46* (2013.01); *F04F 5/54* (2013.01); *Y02T 10/144* (2013.01)

(56) References Cited

U.S. PATENT DOCUMENTS

| | | | | |
|---|---|---|---|---|
| 2015/0096541 A1* | 4/2015 | Edmund | .......... | F02M 35/10222 123/520 |
| 2016/0186694 A1* | 6/2016 | Wakamatsu | .......... | F02M 25/08 123/519 |
| 2016/0305377 A1* | 10/2016 | Stefaniak | .......... | F02M 35/10229 |
| 2016/0377038 A1* | 12/2016 | Bittner | .......... | F02M 25/0836 123/533 |
| 2018/0058385 A1* | 3/2018 | Choi | .......... | F02M 25/0836 |
| 2018/0087476 A1* | 3/2018 | Amemiya | .......... | F02B 37/225 |
| 2018/0163646 A1* | 6/2018 | Tsutsumi | .......... | F02D 41/2422 |
| 2018/0171901 A1* | 6/2018 | Omichi | .......... | F02D 41/0032 |

FOREIGN PATENT DOCUMENTS

| | | |
|---|---|---|
| JP | 2003042008 A | 2/2003 |
| JP | 2007285126 A | 11/2007 |
| JP | 2009133292 A | 6/2009 |
| JP | 2014240621 A | 12/2014 |
| JP | 2015169124 A | 9/2015 |

OTHER PUBLICATIONS

Japanese Office Action dated Feb. 26, 2019, for Japanese Application No. 2015-196068 (6 p.).
English Translation of Japanese Office Action dated Feb. 26, 2019, for Japanese Application No. 2015-196068 (5 p.).

\* cited by examiner

FUEL VAPOR PROCESSING APPARATUS

CROSS-REFERENCE TO RELATED APPLICATIONS

The present application is a 35 U.S.C. § 371 national stage application of PCT Application No. PCT/JP2016/075442 filed Aug. 31, 2016, which claims priority to Japanese Patent Application No. 2015-196068 filed Oct. 1, 2015, both of which are incorporated by reference herein in their entireties for all purposes.

STATEMENT REGARDING FEDERALLY SPONSORED RESEARCH OR DEVELOPMENT

Not applicable.

TECHNICAL FIELD

The present disclosure relates to a fuel vapor processing apparatus for purging fuel vapor in a supercharged internal combustion engine provided with a supercharging device.

BACKGROUND

In a supercharged internal combustion engine provided with a supercharging device, there has been proposed a fuel vapor processing apparatus including a canister for adsorbing fuel vapor produced in a fuel tank, and an ejector generating a negative pressure by a supercharged gas flowing from an intake passage on a downstream side of the supercharging device to the intake passage on an upstream side of the supercharging device, so that fuel vapor in the canister is purged by the negative pressure (for example, see JP-A-2014-240621).

SUMMARY

A first aspect according to the present disclosure is a fuel vapor processing apparatus for a supercharged internal combustion engine provided with a supercharging device. The fuel vapor processing apparatus comprises a canister adsorbing fuel vapor produced in a fuel tank, and an ejector generating a negative pressure by supercharged air flowing from an intake passage on a downstream side of the supercharging device to the intake passage on an upstream side of the supercharging device, so that fuel vapor in the canister is purged by the negative pressure. The ejector includes an ejector housing extending in a discharge direction of the supercharged air, and the ejector housing is welded to a passage wall of the intake passage such that the supercharged air is discharged into the intake passage on the upstream side of the supercharging device and that the discharge direction of the supercharged air is parallel to a direction of flow of intake air. Therefore, it is possible to reduce the stress applied to the ejector housing and to inhibit damage to the ejector housing. Further, the discharge direction of the supercharged air from the ejector is parallel to the flow direction of the intake air. Therefore, in comparison with an arrangement in which discharge direction of the supercharged air from the ejector is perpendicular to the flow direction of the intake air (for example, see JP-A-2014-240621), it is possible to reduce a pressure loss of the supercharged air discharged from the ejector, whereby it is possible to inhibit degradation of the performance of the ejector.

In another aspect of the present disclosure, a fuel vapor processing apparatus for an internal combustion engine provided with a supercharging device comprises a canister adsorbing fuel vapor produced in a fuel tank, and an ejector generating a negative pressure by supercharged air flowing from an intake passage on a downstream side of the supercharging device to the intake passage on an upstream side of the supercharging device, so that fuel vapor in the canister is purged by the negative pressure. An ejector housing of the ejector includes a housing body defining a discharge port for the supercharged air, and the housing body is formed integrally with a passage wall of the intake passage such that the supercharged air is discharged from the discharge port into the intake passage on the upstream side of the supercharging device. According to this construction, the housing body of the ejector housing of the ejector is formed integrally with a passage wall of the intake passage such that the supercharged air is discharged from the discharge port into the intake passage on the upstream side of the supercharging device. Therefore, it is possible to reduce the stress applied to the ejector housing and to inhibit damage to the ejector housing.

The housing body may be arranged such that a discharge direction of the supercharged air from the discharge port is at an acute angle to a direction of flow of intake air within the passage wall. Therefore, in comparison with an arrangement in which discharge direction of the supercharged air from the ejector is perpendicular to the flow direction of the intake air (for example, see JP-A-2014-240621), it is possible to reduce a pressure loss of the supercharged air discharged from the ejector, whereby it is possible to inhibit degradation of the performance of the ejector.

In a further aspect according to the present disclosure, a fuel vapor processing apparatus for a supercharged internal combustion engine provided with a supercharging device comprises a canister adsorbing fuel vapor produced in a fuel tank, and an ejector generating a negative pressure by supercharged air produced by the supercharging device, so that fuel vapor in the canister is purged by the negative pressure. The ejector is arranged in an intake passage on a downstream side of the supercharging device. Therefore, it is possible to reduce the stress applied to the ejector housing and to inhibit damage to the ejector housing. Further, because a part of the supercharged air is directly supplied to the ejector, it is possible to omit a pipeline on a supply side of the supercharged air to the ejector. Therefore, it is possible to achieve a reduction in weight and a reduction in cost of the apparatus. Further, it is possible to reduce an installation space for the ejector In a still further aspect according to the present disclosure, a fuel vapor processing apparatus for a supercharged internal combustion engine provided with a supercharging device comprises a canister adsorbing fuel vapor produced in a fuel tank, and an ejector generating a negative pressure by supercharged air flowing from an intake passage on a downstream side of the supercharging device to the intake passage on an upstream side of the supercharging device, so that fuel vapor in the canister is charged by the negative pressure. An ejector housing of the ejector is integrated with a passage wall of the intake passage such that the supercharged air is discharged into the intake passage on the upstream side of the supercharging device and that the discharge direction of the supercharged air is parallel to a direction of flow of intake air. According to this construction, the ejector housing of the ejector is integrated with the passage wall of the intake passage such that the supercharged air is discharged into the intake passage on the upstream side of the supercharging device and that the discharge direction of the supercharged air is parallel to the direction of flow of the intake air. Therefore, in comparison with an arrangement in which discharge direction of the supercharged air from the ejector crosses perpendicularly to the flow direction of the intake air (for example, see JP-A-2014-240621), it is possible to reduce a pressure loss of the supercharged air discharged from the ejector, whereby it is possible to inhibit degradation of the performance of the ejector.

An ejector housing of the ejector may include a housing body defining a discharge port for the supercharged air. The housing body can be welded to the passage wall of the intake passage. According to this construction, the ejector housing of the ejector can be integrated with the passage wall of the intake passage through welding.

A flow control valve may be accommodated in the ejector and controls a flow rate of supercharged air flowing into a nozzle portion according to a supercharging pressure of the supercharged air. According to this construction, by the flow control valve accommodated in the ejector, the flow rate of supercharged air flowing into the nozzle portion is controlled according to a supercharging pressure of the supercharged air. Therefore, even in the range where the supercharging pressure is large, it is possible to ensure the purge flow rate of the fuel vapor.

A plurality of ejectors may be disposed at the passage wall and oriented parallel to each other.

The fuel vapor processing apparatus may be further provided with a control device selectively switching the ejector to be operated between the plurality of ejectors based on an intake air pressure. According to this construction, the plurality of ejectors can be selectively used based on the intake air pressure.

The fuel vapor processing apparatus may be further provided with a control device selectively switching the ejector to be operated between the plurality of ejectors based on an actual air-fuel ratio in an exhaust system of the internal combustion engine or based on a feedback correction factor for an air-fuel ratio control. According to this construction, the plurality of ejectors can be selectively used by the control device based on the actual air-fuel ratio in the exhaust system of the internal combustion engine or based on the feedback correction factor for the air-fuel ratio control.

DETAILED DESCRIPTION

According to JP-A-2014-240621, an ejector housing of the ejector is attached to a predetermined portion of a vehicle by a fastening device. In addition, an end portion of the ejector housing on a side of a discharge port is connected through fitting with an opening opened at a passage wall of the intake passage. Thus, the ejector housing is attached to two different members. Consequently, it is susceptible to induce a displacement between the two members, thereby applying stress to the ejector housing and increasing the risk of damage to the end portion of the ejector housing on the side of the discharge port. Accordingly, there has been a need in the art to provide a fuel vapor processing apparatus that can reduce the potential for damage to an ejector housing of an ejector.

Embodiments of the present disclosure will be hereinafter described.

Figure 1:
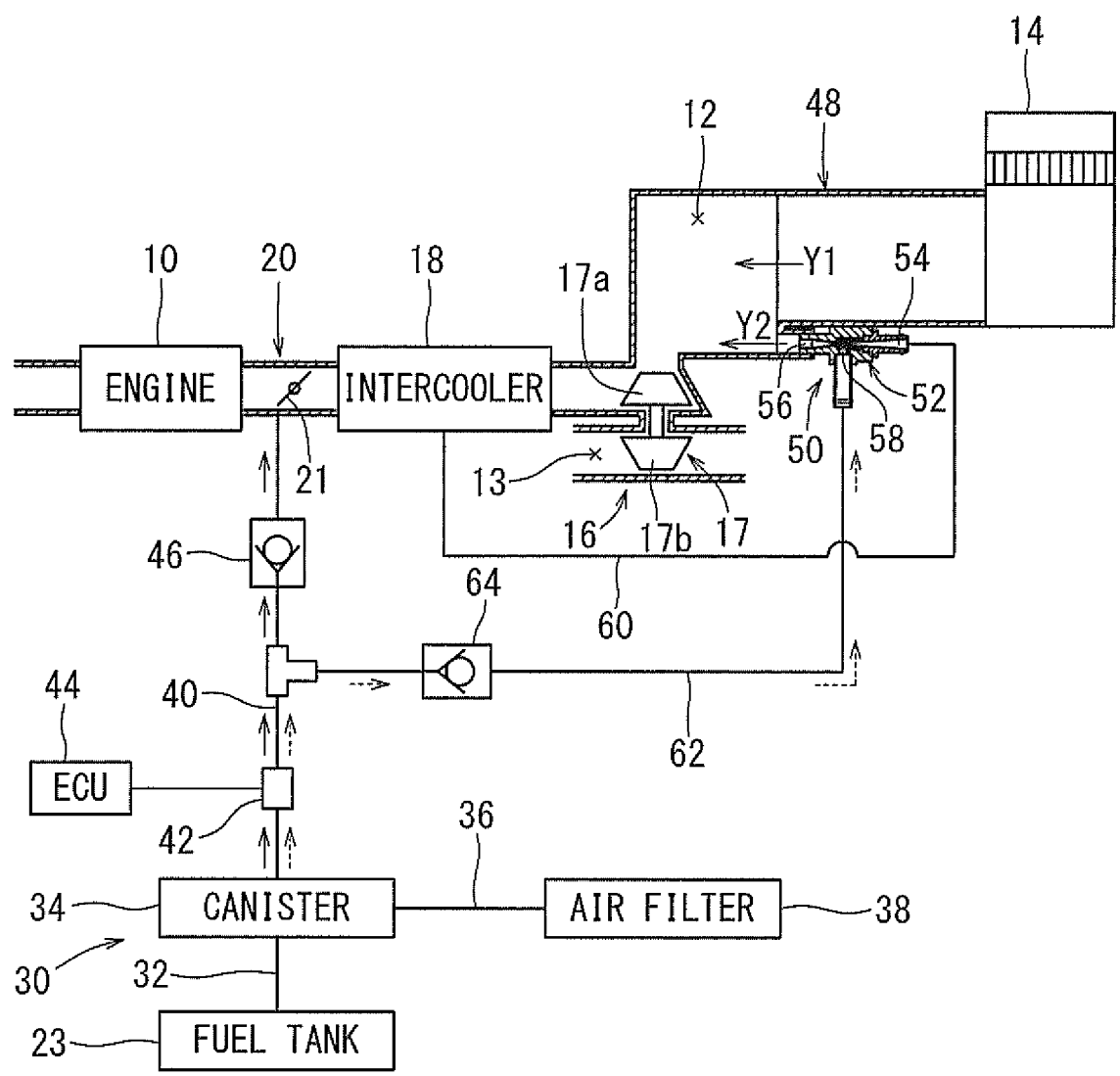
FIG. 1 is a schematic view of a fuel vapor processing apparatus according to a first embodiment.

A fuel vapor processing apparatus according to a first embodiment is disposed in a vehicle, such as an automobile. An engine that is a supercharged internal combustion engine is installed on the vehicle. FIG. 1 is a schematic view illustrating the fuel vapor processing apparatus. As shown in FIG. 1, at an intake passage 12 communicating with an engine 10, there are provided, in the order from its upstream side, an air cleaner 14, a turbocharger 16, an intercooler 18 and a throttle device 20. The air cleaner 14 filters external air suctioned into the intake passage 12.

The turbocharger 16 is provided with a rotor 17 that is rotatable. The rotor 17 is provided with a compressor 17a disposed in the intake passage 12, and a turbine 17b disposed in an exhaust gas passage 13 communicating with the engine 10. The turbocharger 16 is configured such that the rotor 17 (more specifically, the turbine 17b) rotates by the exhaust gas flowing though the exhaust gas passage 13, so that to the intake air flowing though the intake passage 12 is supercharged by the rotor 17 (more specifically, by the compressor 17a). Thus, the turbocharger 16 serves as a supercharging device.

The intercooler 18 cools the intake air supercharged by the turbocharger 16, i.e., the supercharged air, to an appropriate temperature. The throttle device 20 is provided with a throttle valve 21 for opening and closing the intake passage 12. The degree of opening of the throttle valve 21 is controlled by a driver of the vehicle. In this way, the amount of intake air suctioned into the engine 10 is adjusted.

A fuel vapor processing apparatus 30 is a device for purging fuel vapor produced in a fuel tank 23, into the intake passage 12 of the engine 10. A canister 34 is connected to the fuel tank 23 via a fuel vapor passage 32. An adsorbent, such as activated carbon, for adsorbing and desorbing fuel vapor at least partially fills the case of the canister 34. The canister 34 is opened to the atmosphere via an atmospheric passage 36. An air filter 38 is disposed on the upstream side of the atmospheric passage 36. The air filter 38 filters air that is introduced into the atmospheric passage 36. Further, the canister 34 is connected to the intake passage 12 at a position on the downstream side of the throttle valve 12 via a purge passage 40.

Fuel vapor produced in the fuel tank 23 is adsorbed by the canister 34 (more specifically, the adsorbent, such as activated carbon) via the fuel vapor passage 32. By the intake air of the engine 10, fuel vapor adsorbed by the adsorbent of the canister 34 is desorbed from the adsorbent together with the air introduced into the canister 34 via the atmospheric passage 36 and is thereafter purged into the intake passage 12 via the purge passage 40.

In the purge passage 40, a purge valve 42 constituted by an electromagnetic valve is provided for opening and closing the purge passage 40. The purge valve 42 is controlled for opening and closing by a control circuit (ECU) 44. A check valve 46 (hereinafter called "a purge passage check valve") is provided in the purge passage 40 on the downstream side of the purge valve 42, i.e., between the purge valve 42 and the intake passage 12. The purge passage check valve 46 is opened by the flow of fuel vapor in the purge passage 42 from the side of the purge valve 42 toward the intake passage 12, while it is closed for preventing backflow of fuel vapor.

An ejector 50 is disposed at a tubular member 48 that serves as a passage wall forming at least a part of the intake passage 12 on the upstream side of the compressor 17a of the turbocharger 16, i.e., between the turbocharger 16 and the air cleaner 14. An ejector housing of the ejector 50 includes an introduction port 54 for the supercharged air, a discharge port 56 for the supercharged air, and a suction port 58 for the fuel vapor. The ejector 50 is configured to generate a negative pressure by the supercharged air flowing from the downstream side toward the upstream side of the turbocharger 16, so that the fuel vapor within the canister 34 is purged by the negative pressure. The ejector 50 will be explained later.

A supercharged air returning passage 60 is branched off from the downstream side of the compressor 17a of the turbocharger 16, for example, from the intake passage 12 on the downstream side of the intercooler 18. The downstream end of the supercharged air returning passage 60 is connected to the introduction port 54 of the ejector 50. Further, a purge branch passage 62 is branched off from the purge passage 40 at a position on the downstream side of the purge valve 42, i.e., between the purge valve 42 and the purge passage check valve 46. The downstream end of the purge branch passage 62 is connected to the suction port 58 of the ejector 50. A check valve 64 (hereinafter called "an ejector check valve") is provided in the purge branch passage 62. The ejector check valve 64 is opened by the flow of fuel vapor in the purge branch passage 62 from the side of the purge valve 42 toward the ejector 50, while it is closed for preventing backflow of fuel vapor.

Figure 2:
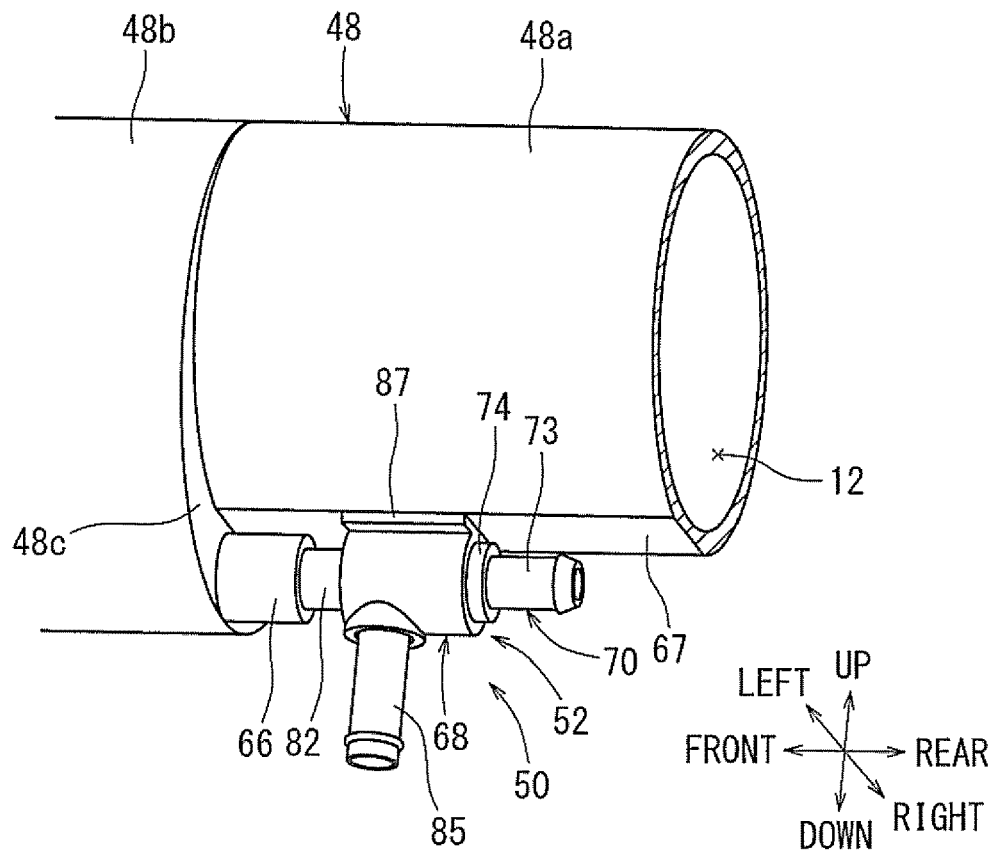
FIG. 2 is a perspective view illustrating a peripheral portion of the ejector of FIG. 1.
Figure 3:
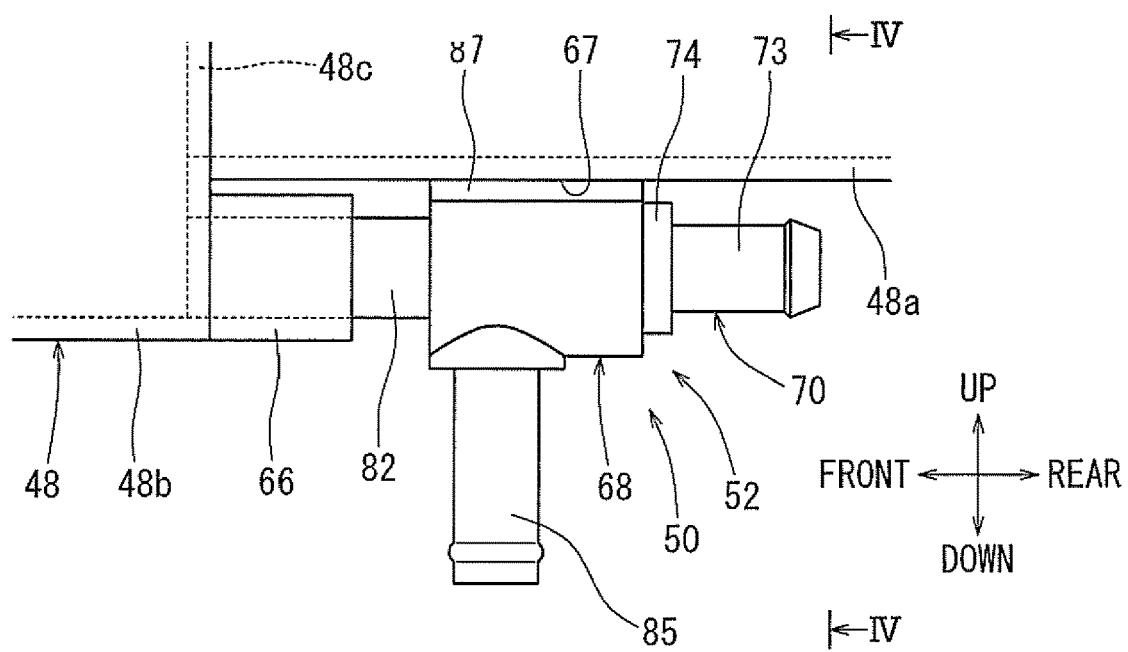
FIG. 3 is a side view illustrating the peripheral portion of the ejector of FIG. 2.
Figure 4:
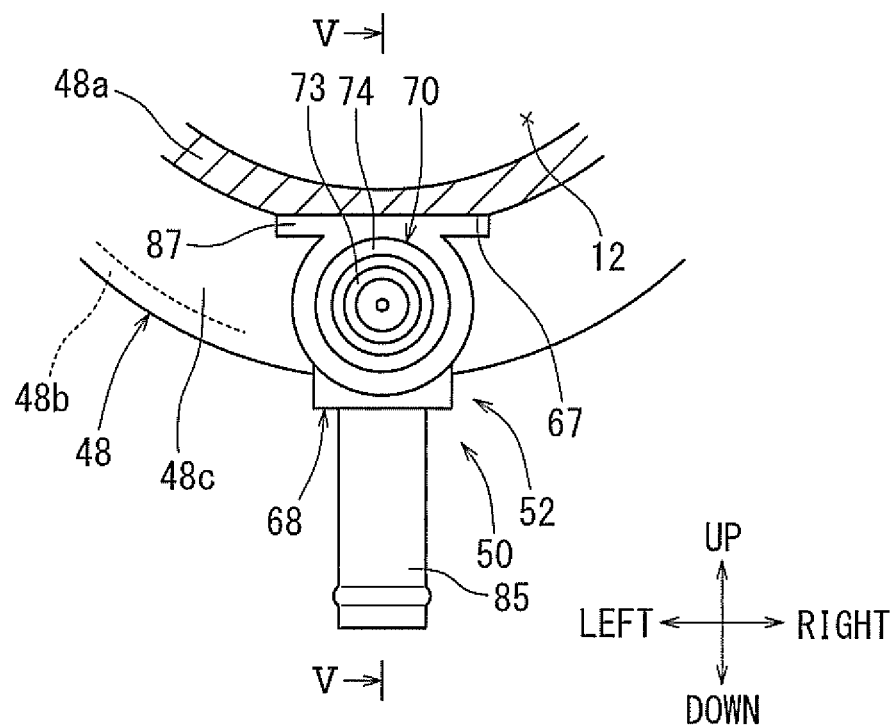
FIG. 4 is a sectional view taken along line IV-IV in FIG. 3.

Next, the tubular member 48 and the ejector 50 will be described with reference to FIGS. 2 to 4. Although the directions for the tubular member 48 and the ejector 50 will be determined as indicated by arrows in FIGS. 2 to 4, this determination does not specify the arrangements of the tubular member 48 and the ejector 50.

As shown in FIGS. 2 to 5, the tubular member 48 is made of resin and is formed to have a straight tube shape. The tubular member 48 includes an upstream side tube portion 48a having a cylindrical tube shape, and a downstream side tube portion 48b having a cylindrical tube shape and formed on the downstream side of the upstream side tube portion 48a. The downstream side tube portion 48b has a diameter larger than a diameter of the upstream side tube portion 48a and is offset downward relative to the upstream side tube portion 48a such that its wall portion on the upper end side is serially continuous with the upstream side tube portion 48a. A step-shaped connection portion between the upstream side tube portion 48a and the downstream side tube portion 48b is closed by a step-shaped wall portion 48c.

Figure 5:
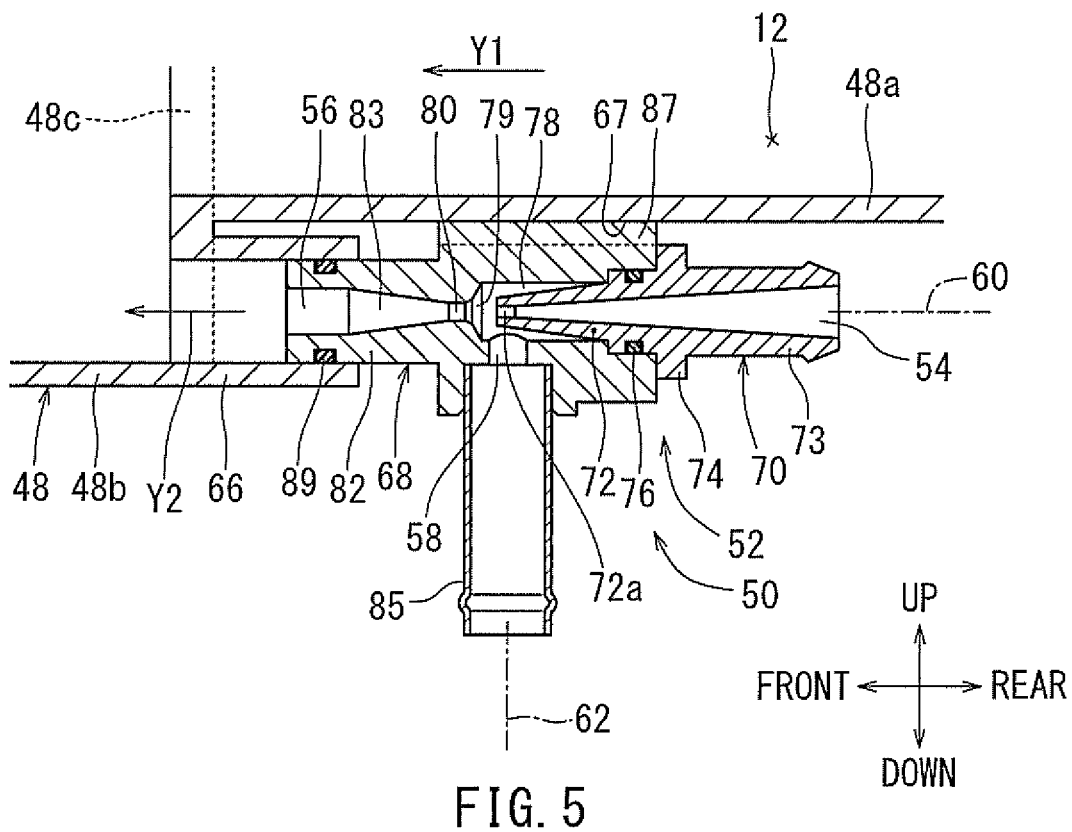
FIG. 5 is a sectional view taken along line V-V in FIG. 4.

As shown in FIG. 5, within the tubular member 48, the intake passage 12 extends in a straight manner. Therefore, the direction of flow of intake air within the tubular member 48 (see arrow Y1 in FIG. 5) is oriented forwardly in the axial direction (leftward in FIG. 5) of the upstream side tube portion 48a and the downstream side tube portion 48b. A connection tube portion 66 having a cylindrical tube shape and extending parallel to the upstream side tube portion 48a is formed integrally with the lower end portion of the step-shaped wall portion 48c. The connection tube portion 66 protrudes rearward (rightward in FIG. 5) from the step-shaped wall portion 48c. The inside of the connection tube portion 66 is in communication with the intake passage 12. An attachment surface 67 defined by a flat surface is formed on the outer side surface of the upstream side tube portion 48a (see FIG. 2). Here, the tubular member 48 serves as a passage wall of a part of the intake passage 12. A part of the intake passage 12 within the tubular member 48 is located on the upstream side of the turbocharge 16.

As shown in FIG. 5, the ejector 50 is a fixed-type ejector which provides a non-variable flow rate supplied to a nozzle portion 72. The ejector 50 includes an ejector housing 52. The ejector housing 52 is provided with a resin-made body member 68 and a resin-made nozzle member 70. The nozzle member 70 integrally includes the nozzle portion 72 formed to have a tapered tube shape tapered toward its tip end, an introduction pipe portion 73 extending rearward from the nozzle portion 72 in series therewith, and a flange portion 74 protruding radially outward from the rear end portion of the nozzle portion 72. An orifice portion 72a having a predetermined nozzle diameter is formed in the tip end portion of the nozzle portion 72. The inside of the introduction pipe portion 73 is configured as the introduction port 54.

The body member 68 is formed to have a stepped tubular shape. The nozzle portion 72 of the nozzle member 70 is coaxially fitted into the body member 68 from the rear side. The flange portion 74 of the nozzle member 70 is welded to the rear end surface of the body member 68. An O-ring 76 is interposed between the fitting portions of the body member 68 and the nozzle member 70. A negative pressure chamber 78 having a hollow cylindrical shape surrounding the periphery of the nozzle portion 72 is formed within the body member 68. Within the front end portion of the negative pressure chamber 78, there are coaxially formed a throttle portion 79 having a tapered bore shape with an inner diameter decreasing in the downward direction, and a throat portion 80 having a cylindrical bore shape and arranged in series with the throttle portion 79 on the downstream side thereof.

A discharge pipe portion 82 is coaxially integrally formed with the front end portion of the body member 68. A diffuser portion 83 arranged in series with the throat portion 80 on the downstream side thereof and having a tapered bore shape with an inner diameter increasing toward the downstream side is formed in the discharge pipe portion 82. The front end opening of the diffuser portion 83 is configured as the discharge port 56. Further, because the body member 68 and the nozzle member 70 are coaxial with each other, the passage led from the introduction port 54 to the discharge port 56 extends in a straight manner. Therefore, the discharge direction of the supercharged air from the discharge port 56 (see arrow Y2 in FIG. 5) is oriented forward in the axial direction of the ejector housing 52. Here, by the body member 68 and the nozzle member 70, the ejector housing 52 is formed to have a hollow tubular shape extending in the axial direction, i.e., the discharge direction of the supercharged air.

The suction port 58 is formed in the lower portion of the body member 68 to have a hollow cylindrical shape in communication with the negative pressure chamber 78. A connection pipe 85 is connected to the suction port 58. An attachment portion 87 having a rectangular flat-plate shape is formed integrally with the upper end portion of the body member 68. The body member 68 serves as a housing body of the ejector 50.

The ejector 50 is installed on the tubular member 48 in the following way. As shown in FIG. 5, the tip end portion of the discharge pipe portion 82 of the body member 68 of the ejector housing 52 is fitted into the connection tube portion 66 of the tubular member 48. In this state, the attachment portion 87 of the body member 68 is welded to the attachment surface 67 of the tubular member 48. In this way, the flow direction of the intake air within the tubular member 48 (see arrow Y1 in FIG. 5) and the discharge direction of the supercharged air from the discharge port 56 of the ejector 50 (see arrow Y2 in FIG. 5) are set to be parallel to each other. Further, an O-ring 89 is interposed between the discharge pipe portion 82 and the connection tube portion 66 for sealing therebetween.

The supercharged air returning passage 60 is connected to the introduction port 54 of the ejector 50. The purge branch passage 62 is connected to the suction port 58 of the ejector 50. Here, the supercharged air returning passage 60 and the passage within the ejector 50 form a bypass passage communicating between the intake passage 12 on the upstream side of the turbocharger 16 and the intake passage 12 on the downstream side of the turbocharge 16. Further, by positioning the discharge port 56 of the ejector 50 to be nearer to the turbine 17b of the turbocharger 16, the negative pressure generated at a position adjacent to the upstream side of the turbine 17b can be used for suctioning the supercharged air discharged from the discharge port 56.

With the fuel vapor processing apparatus 30 (see FIG. 1) described above, in the case where the pressure on the downstream side of the throttle valve 21, i.e., the intake air pressure, becomes negative during the operation of the engine 10, the purge passage check valve 46 is opened by the intake negative pressure when the purge valve 42 is opened by the control circuit 44. Therefore, the fuel vapor within the canister 34 is purged into the intake passage 12 via the purge passage 40 (see arrows indicted by solid lines in FIG. 1). The purge flow rate at that time is adjusted through control of the purge valve 42 by the control circuit 44. Further, because the ejector check valve 64 is in a closed state, backflow of the intake air from the side of the ejector 50 toward the purge branch passage 62 is prevented. Further, if the supercharged pressure generated by the turbocharger 16 is equal to or less than a predetermined value, the negative pressure generated at the ejector 50 is small, and therefore, the ejector check valve 64 is not opened.

Further, if the supercharged pressure generated by the turbocharger 16 has become higher than the predetermined pressure to cause an increase of the intake pressure than the atmospheric pressure, the purge passage check valve 46 is brought to be a closed state. On the other hand, the supercharged air flows into (is applied to) the discharge port 56 from the introduction port 54 of the ejector 50 via the supercharged air returning passage 60, whereby a predetermined negative pressure is generated at the suction port 58. Then, the ejector check valve 64 is opened, so that the fuel vapor within the canister 34 is suctioned into the suction port 58 of the ejector 50 via the purge branch passage 62 branched off from the purge passage 40 and is purged by being discharged together with the supercharged air from the discharge port 56 into the intake passage 12 (see arrows indicated by dotted lines in FIG. 1).

According to the fuel vapor processing apparatus 30 described above, the ejector housing 52 extending in the discharge direction of the supercharged air from the ejector 50 (see arrow Y2 in FIG. 5) is welded to the tubular member 48 defining a passage wall of the intake passage 12 such that the ejector housing 52 discharges the supercharged air into the intake passage 12 on the upstream side of the turbocharger 16 and that the discharge direction (see arrow Y2 in FIG. 5) of the supercharged air is parallel to the flow direction of the intake air (see arrow Y1 in FIG. 5). Therefore, it is possible to reduce the stress applied to the ejector housing 52 and to inhibit damage to the ejector housing 52.

Further, because the damage to the ejector housing 52 is inhibited, it is possible to omit a pressure sensor required for a failure diagnosis (OBD), i.e., a pressure sensor for detecting the pressure on the discharge side of the ejector 50. The failure diagnosis may be performed, for example, by using an intake pressure sensor that detects the intake pressure.

Further, the discharge direction of the supercharged air from the ejector 50 (see arrow Y2 in FIG. 5) is parallel to the flow direction of the intake air (see arrow Y1 in FIG. 5). Therefore, in comparison with an arrangement in which discharge direction of the supercharged air from the ejector 50 crosses perpendicularly to the flow direction of the intake air (for example, see JP-A-2014-240621), it is possible to reduce a pressure loss of the supercharged air discharged from the ejector 50, whereby it is possible to inhibit degradation of the performance of the ejector 50.

Further, the ejector 50 is a fixed-type ejector which provides a non-variable flow rate supplied to the nozzle portion 72, and therefore, by setting the nozzle diameter to be smaller, it is possible to increase the flow velocity of the supercharged air so as to generate a larger negative pressure. Therefore, it is not likely that the purge flow rate is influenced by the system pressure loss caused during the flow from the air filter 38 to the discharge port 56 of the ejector 50 (hereinafter called "a purge-side system pressure loss). For this reason, even in the case where the system pressure loss is high and the applied flow rate (the supplied flow rate of the supercharged air) has a small value, such as about 20 (L/min), it may be possible to ensure, for example, a purge flow rate of about 10 (L/min).

Figure 6:
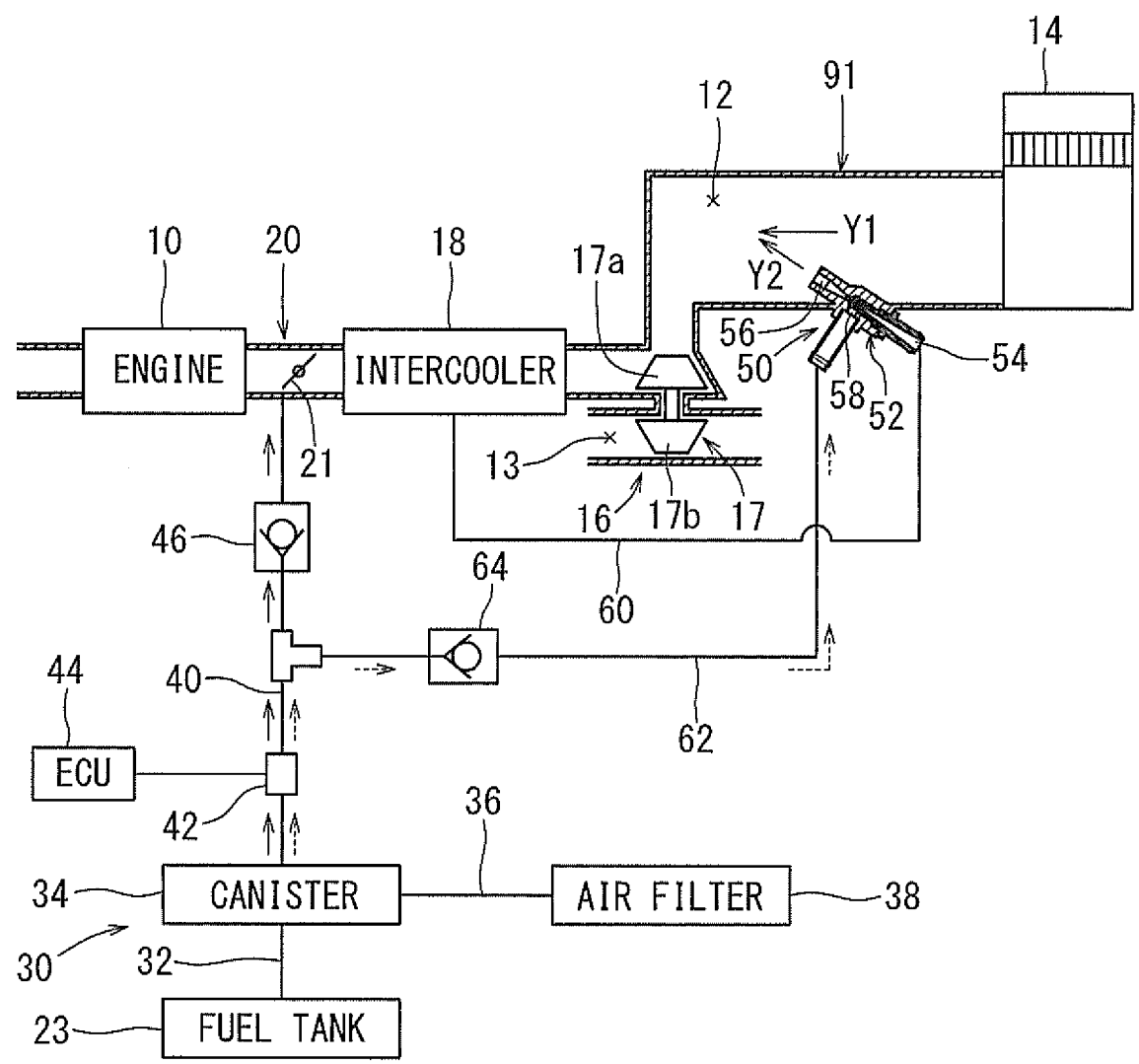
FIG. 6 is a schematic view illustrating a fuel vapor processing apparatus according to a second embodiment.

Embodiments that will be explained later are modifications of the first embodiment, and therefore, the description will be made only for the modified portions, and a redundant explanation will be omitted. FIG. 6 is a schematic view illustrating the fuel vapor processing apparatus 30 according to a second embodiment. As shown in FIG. 6, in this embodiment, the tubular member 48 of the first embodiment (see FIG. 1) is replaced with a tubular member (labelled with reference numeral 91) having a straight tube shape. The tubular member 91 is formed to have a singly cylindrical tubular shape.

Figure 7:
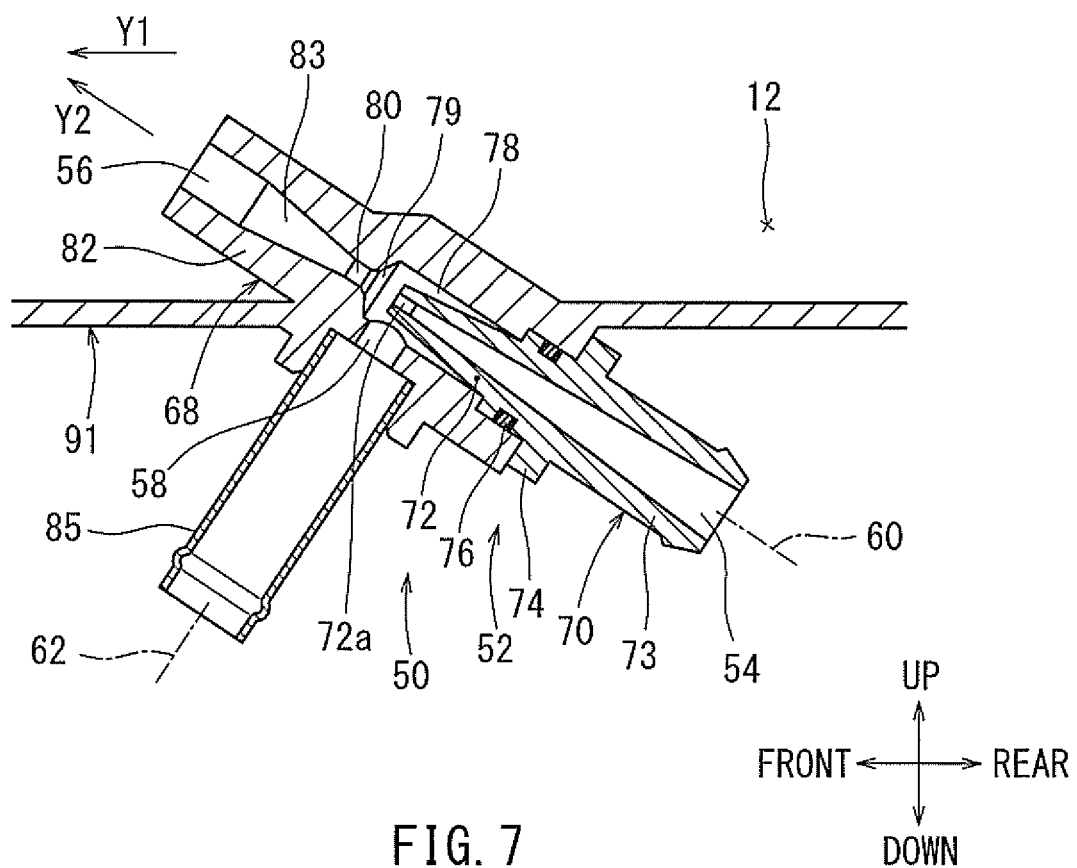
FIG. 7 is a sectional view illustrating a peripheral portion of the ejector of FIG. 6.

As shown in FIG. 7, the body member 68 of the ejector 50 is integrally formed with the tubular member 91 of the intake passage 12 such that the supercharged air is discharged from the discharge port 56 into the tubular member 91. The body member 68 is arranged in an inclined manner such that the discharge direction of the supercharged air from the discharge port 56 (see arrow Y2 in FIG. 6) is at an acute angle to the flow direction of the intake air within the tubular member 91 (see arrow Y1 in FIG. 6). Further, in this embodiment, the attachment portion 87 and the O-ring 89 of the first embodiment (see FIG. 5) are omitted. Here, the tubular member 91 serves as a passage wall of a part of the intake passage 12. Further, a part of the intake passage 12 within the tubular member 91 is located on the upstream side of the turbocharger 16.

According to this embodiment, the body member 68 of the ejector housing 52 of the ejector 50 is integrally formed with the tubular member 91 of the intake passage 12 such that the supercharged air is discharged from the discharge port 56 into the tubular member 91. Therefore, it may be possible to reduce the stress applied to the ejector housing 52 and to inhibit damage to the ejector housing 52

Further, the discharge direction of the supercharged air from the ejector 50 (see arrow Y2 in FIG. 6) is at an acute angle to the flow direction of the intake air (see arrow Y1 in FIG. 6). Therefore, in comparison with the arrangement in which the discharge direction of the supercharged air from the ejector 50 crosses perpendicular to the flow direction of the intake air (see, for example, JP-A-2014-240621), it is possible to reduce the pressure loss of the supercharged air discharged from the ejector 50 and to inhibit a reduction in the performance of the ejector 50.

Figure 8:
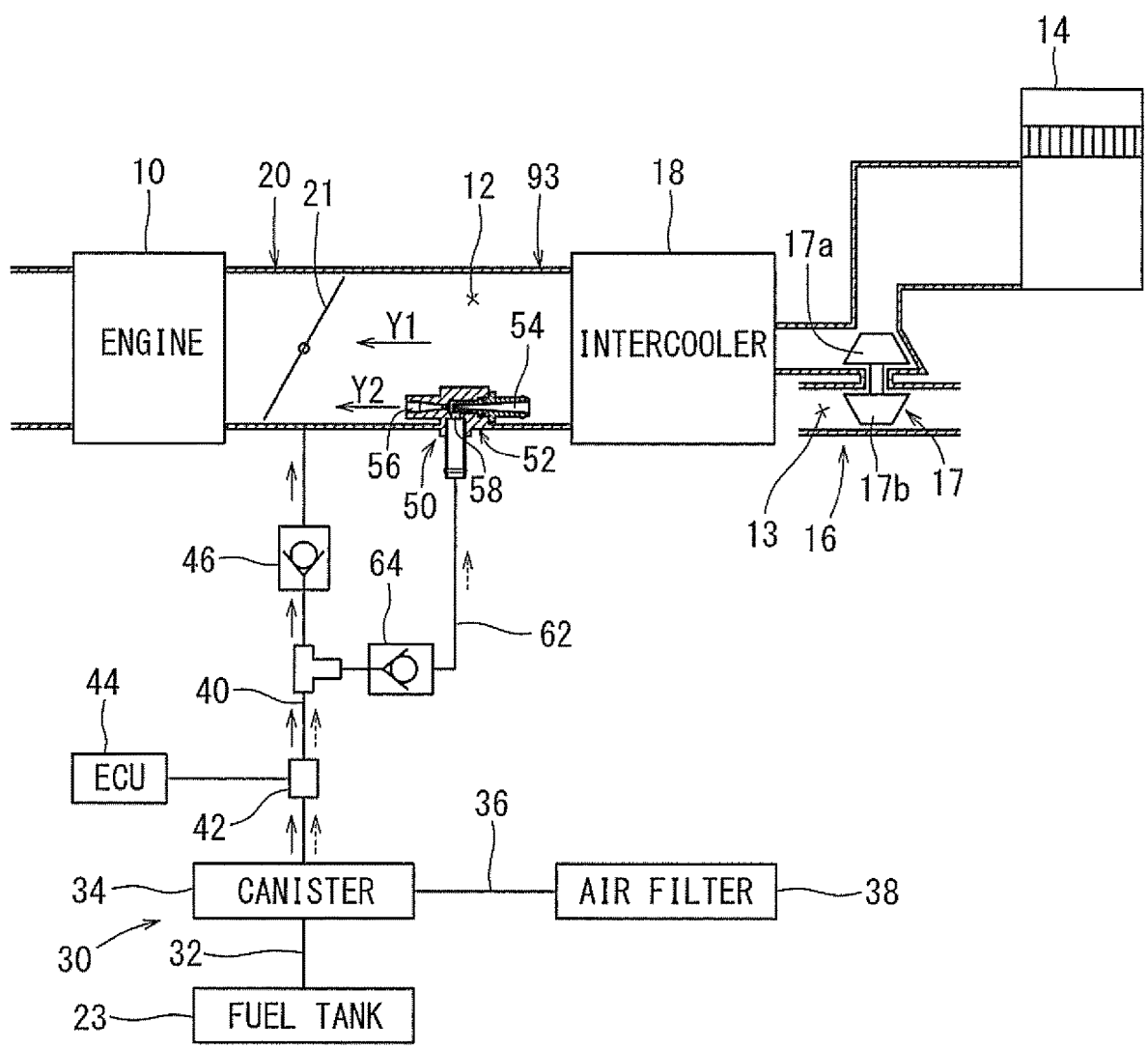
FIG. 8 is a schematic view illustrating a fuel vapor processing apparatus according to a third embodiment.

A third embodiment is a modification of the first embodiment. As shown in FIG. 8, in the fuel vapor processing apparatus 30 according to this embodiment, the ejector 50 is disposed at a tubular member (labelled with reference numeral 93) configured as a passage wall forming at least a part of the intake passage 12 between the intercooler 18 and the throttle device 20 in place of the tubular member 48 of the first embodiment. Further, in this embodiment, the supercharged air returning passage 60 of the first embodiment (see FIG. 1) is omitted.

Figure 9:
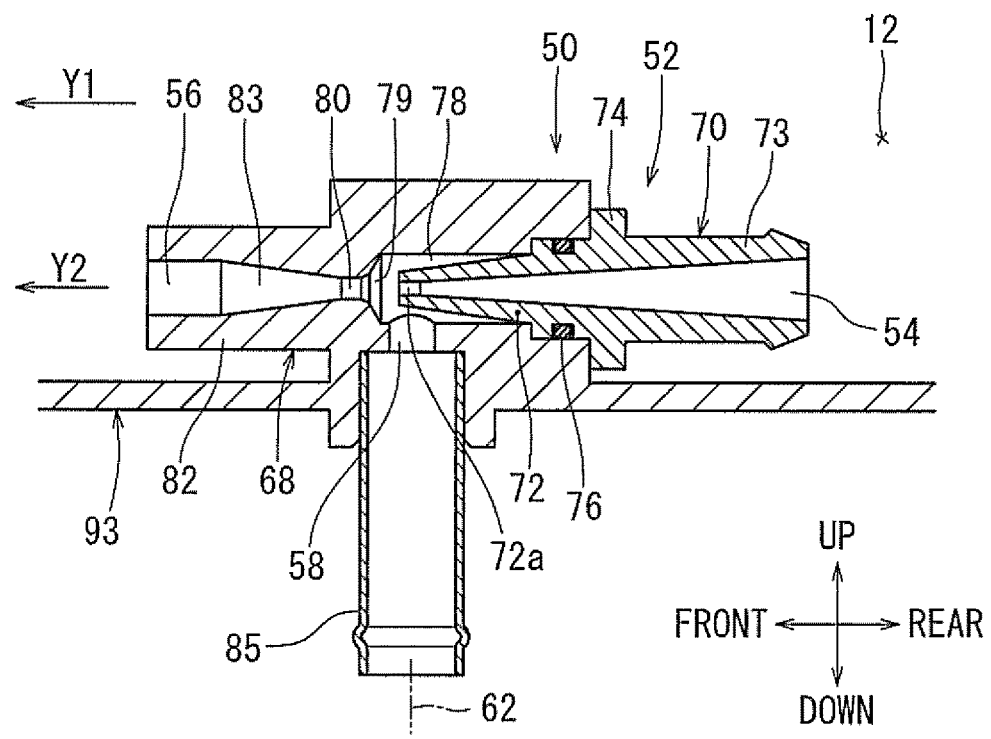
FIG. 9 is a sectional view illustrating a peripheral portion of the ejector of FIG. 8.

As shown in FIG. 9, the tubular member 93 is made of resin and is formed to have a straight tube shape. The ejector 50 is arranged at the intake passage 12 within the tubular member 93. The body member 68 of the ejector housing 52 is formed integrally with the tubular member 93. The body member 68 is arranged such that the discharge direction of the supercharged air from the discharge port 56 of the ejector 50 (see arrow Y2 in FIG. 9) is parallel to the flow direction of the intake air within the tubular member 93 (see arrow Y1 in FIG. 9). Further, in this embodiment, the attachment portion 87 and the O-ring 89 of the first embodiment (see FIG. 5) are omitted. Here, the tubular member 93 serves as a passage wall of a part of the intake passage 12. Further, a part of the intake passage 12 within the tubular member 93 is located on the downstream side of the turbocharger 16.

According to this embodiment, the ejector 50 is arranged at the intake passage 12 on the downstream side of the turbocharger 16. Therefore, it may be possible to reduce the stress applied to the ejector housing 52 and to inhibit damage to the ejector housing 52. Further, because a part of the supercharged air flown through the intercooler 18 from the turbocharger 16 is directly supplied to the ejector 50, it is possible to omit a pipeline on a supply side of the supercharged air to the ejector 50. Therefore, it is possible to achieve a reduction in weight and a reduction in cost of the apparatus. Further, it is possible to reduce an installation space for the ejector 50.

Further, the discharge direction of the supercharged air from the ejector 50 (see arrow Y2 in FIG. 9) is parallel to the flow direction of the intake air and the supercharged air (see arrow Y1 in FIG. 9). Therefore, in comparison with the arrangement in which the discharge direction of the supercharged air from the ejector 50 crosses perpendicular to the flow direction of the intake air (see, for example, JP-A-2014-240621), it is possible to reduce the pressure loss of the supercharged air discharged from the ejector 50 and to inhibit a reduction in the performance of the ejector 50.

Figure 10:
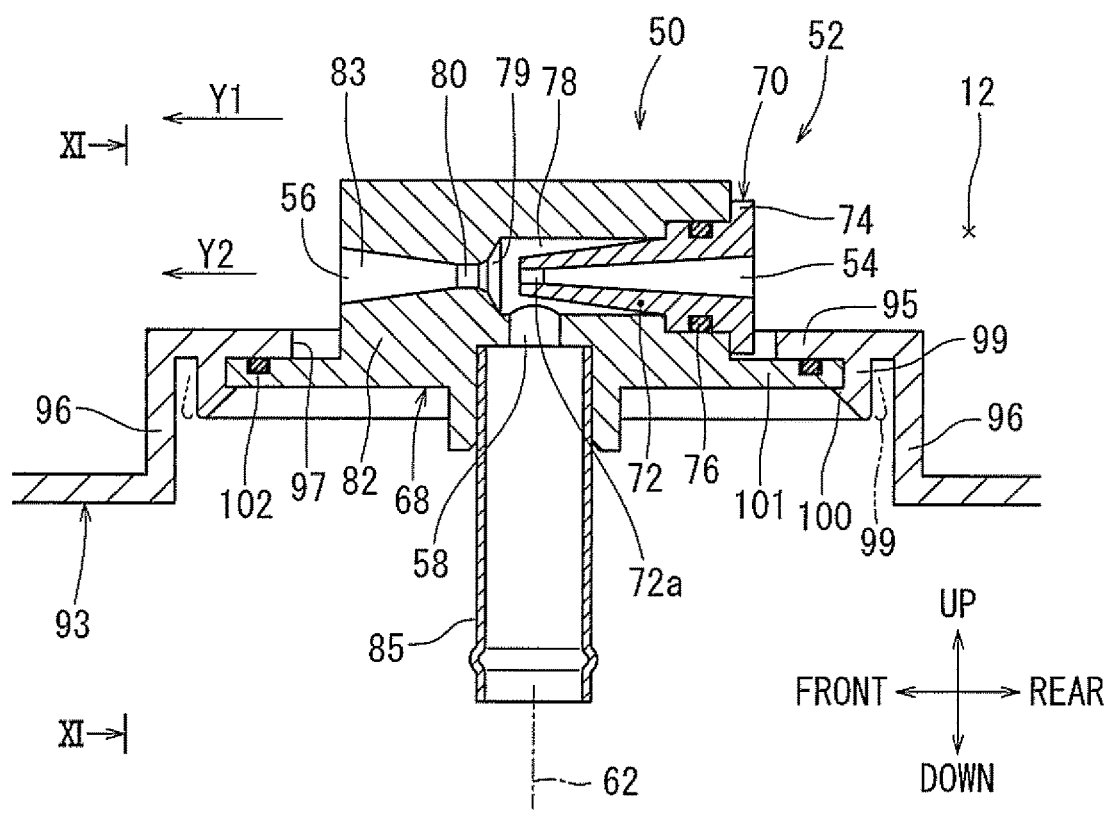
FIG. 10 is a sectional view illustrating a peripheral portion of an ejector according to a fourth embodiment (a modification of the third embodiment to provide a snap-fitting device).
Figure 11:
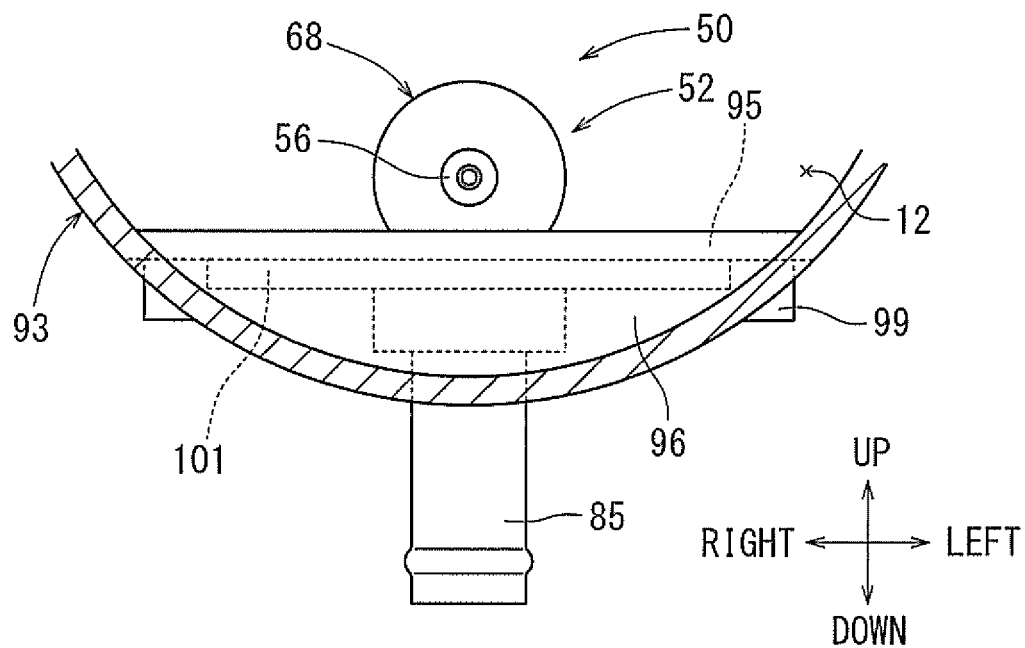
FIG. 11 is a sectional view taken along line XI-XI in FIG. 10.

A fourth embodiment is a modification of the third embodiment. As shown in FIG. 10, in this embodiment, the ejector 50 is attached through snap-fitting to the tubular member 93 in the third embodiment (FIG. 9). More specifically, a seat portion 95 having a horizontal plate shape is formed on the lower portion of the tubular member 93. A stepped connection portion between the tubular member 93 (more specifically, its tubular portion) and the seat portion 95 is closed by front and rear stepped wall portions 96 (see FIG. 11). A circular through-hole 97 is formed in the seat portion 95 to penetrate it in a plate-thickness direction (up-to-down direction). A tubular portion 99 is formed on the lower surface side of the seat portion 95 to surround the open edge of the through-hole 97. Engaging claws 100 protruding radially inward are formed on the lower end portion of the tubular portion 99. The tubular portion 99 is formed to be elastically deformable in a diameter enlarging direction (see two-dot chain lines 99 in FIG. 10).

In the nozzle member 70 of the ejector 50, the introduction pipe portion 73 is removed, so that the rear opening of the nozzle portion 72 is configured as the introduction port 54. Further, an attachment plate portion 101 having an annular plate shape and protruding radially outward in a manner like a flange is formed integrally with the lower end portion of the body member 68.

The ejector 50 is installed on the tubular member 93 in the following way. The ejector housing 52 is inserted into the through-hole 97 of the seat member 95 of the tubular member 93 from the lower side. Next, the attachment plate portion 101 of the body member 68 is attached through snap-fitting to the tubular portion 99 of the seat portion 95 by utilizing the elastic deformation of the tubular portion 99 (see two-dot chain lines in FIG. 10). The attachment plate portion 101 is prevented from removal by the engaging claws 100 of the tubular portion 99. In this way, the ejector housing 52 (more specifically, its majority including the introduction port 54 and the discharge port 56), is installed on the tubular member 93. Further, an O-ring 102 is interposed between the seat portion 95 and the attachment plate portion 101 for sealing therebetween. Here, the attachment plate portion 101 may be fastened to the seat portion 95 of the tubular member 93 by means of thread members, such as bolts.

Figure 12:
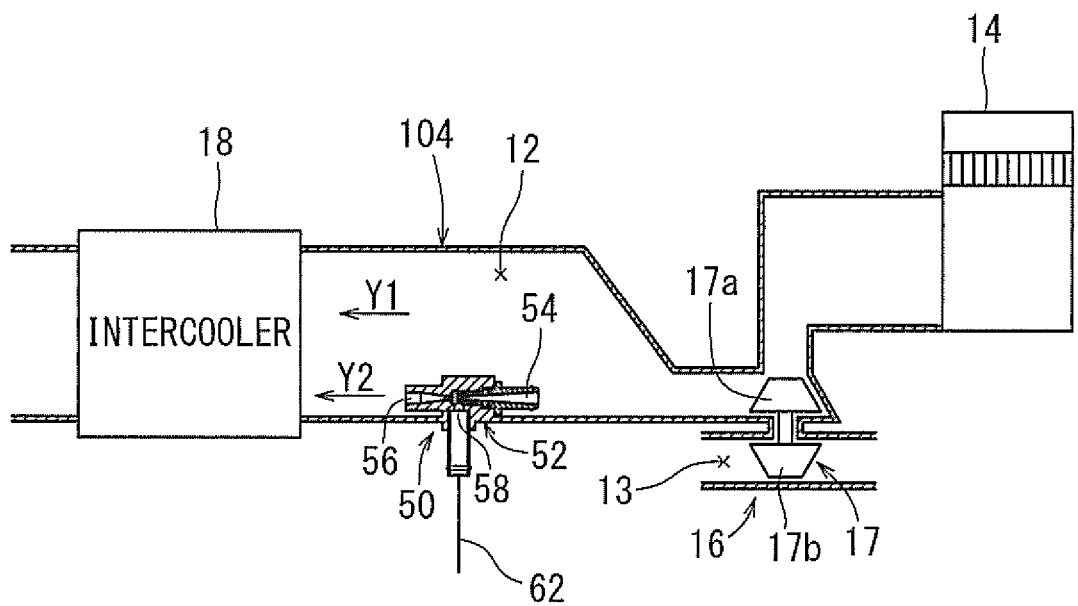
FIG. 12 is a schematic view illustrating a part of a fuel vapor processing apparatus according to a fifth embodiment.

A fifth embodiment is a modification of the third embodiment. As shown in FIG. 12, in this embodiment, the ejector 50 is arranged at a tubular member 104 configured as a passage wall forming at least a part of the intake passage 12 between the turbocharger 16 and the intercooler 18 in place of the tubular member 93 of the third embodiment (FIG. 8). Here, the tubular member 104 serves as a passage wall of a part of the intake passage 12. Further, a part of the intake passage 12 within the tubular member 104 is located on the downstream side of the turbocharger 16.

Figure 13:
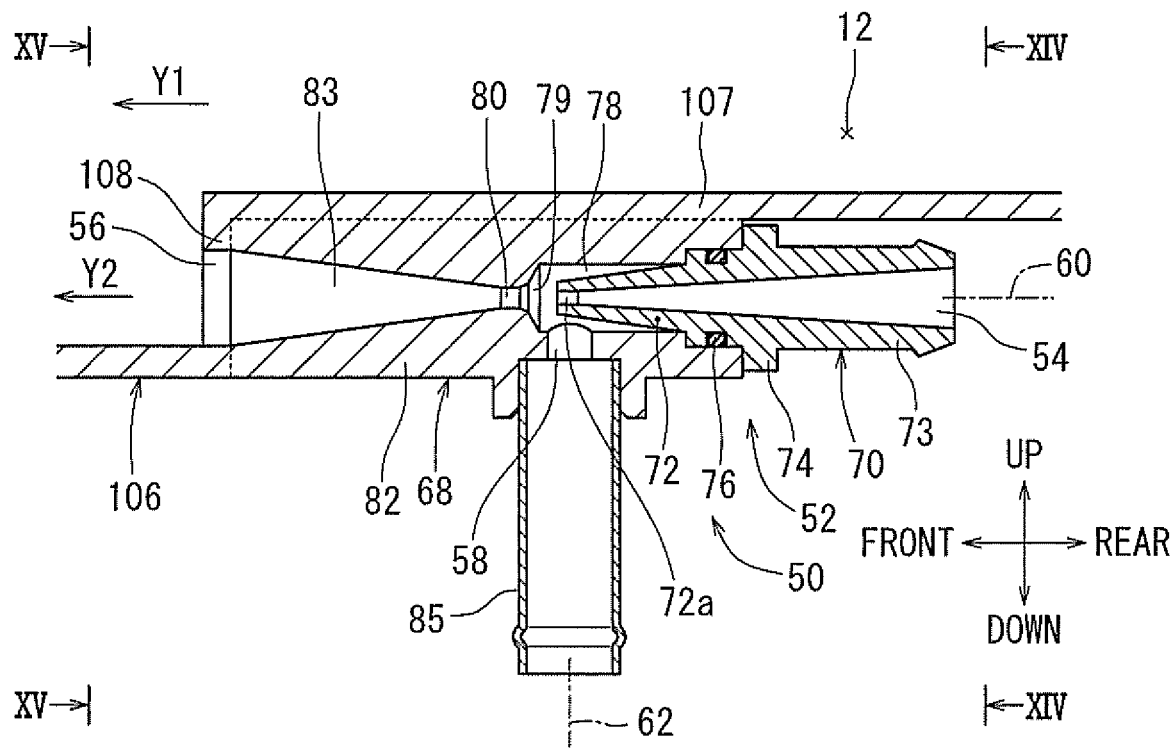
FIG. 13 is a sectional view illustrating a peripheral portion of an ejector according to a sixth embodiment.
Figure 15:
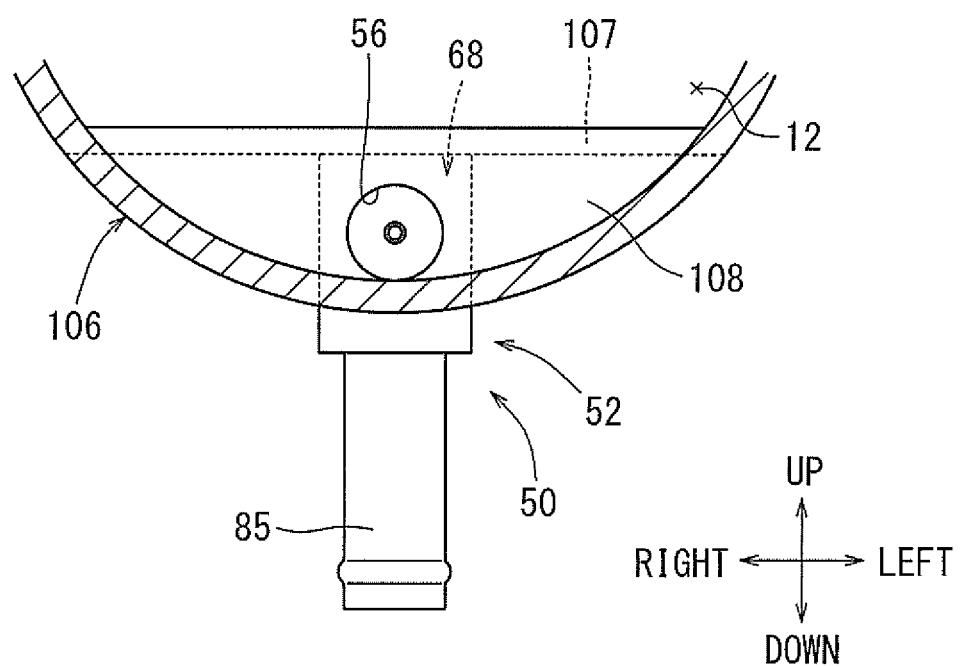
FIG. 15 is a sectional view taken along line XV-XV in FIG. 13.

A sixth embodiment is a modification of the first embodiment. As shown in FIG. 13, in this embodiment, the tubular member 48 of the first embodiment (see FIG. 5) is replaced with a tubular member (labeled with reference numeral 106) having a straight tube shape. A flat plate portion 107 having a horizontal plate shape is formed on the lower portion of the tubular member 106. A stepped connection portion between the tubular member 106 (more specifically, its tubular portion) and the flat plate portion 107 is closed by a stepped wall portion 108 (see FIG. 15).

Figure 14:
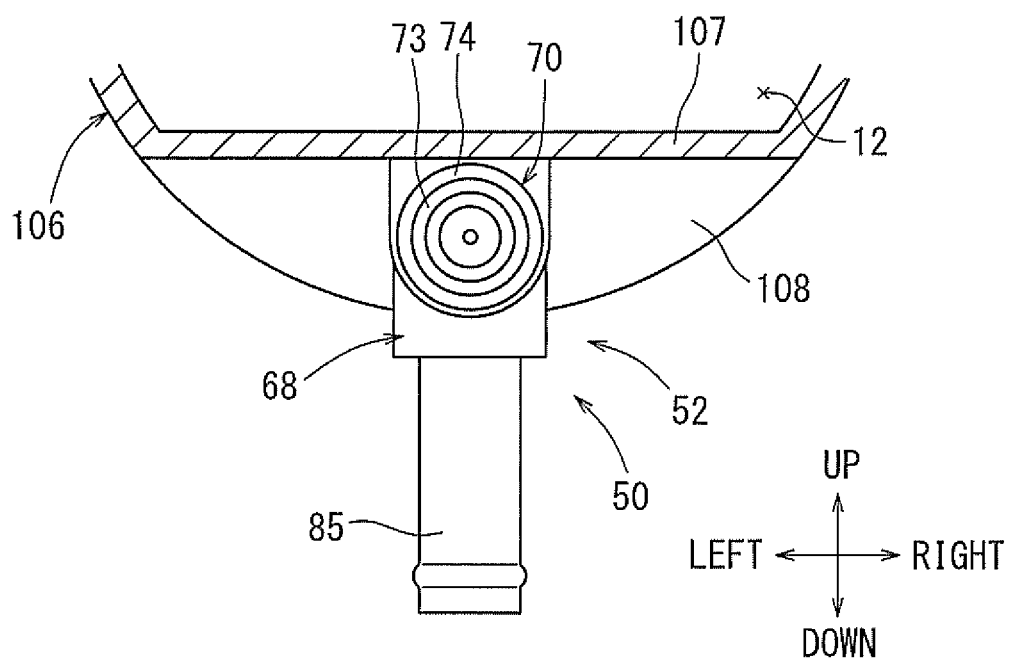
FIG. 14 is a sectional view taken along line XIV-XIV in FIG. 13.

The body member 68 of the ejector 50 is formed integrally with a corner portion formed between the flat plate portion 107 and the stepped wall portion 108 of the tubular member 106. The outer contour of the body member 68 is formed to have a rectangular tubular shape extending in the front-to-rear direction (see FIG. 14). The upper side portion of the body member 68 is continuous with the flat plate portion 107, and the front end portion of the body member 68 is continuous with the stepped wall portion 108. The discharge port 56 of the body member 68 is opened at the front end surface of the stepped wall portion 108 (see FIG. 15). Also in this case, the body member 68 is arranged such that the discharge direction of the supercharged air from the discharge port 56 of the ejector 50 (see arrow Y2 in FIG. 13) is parallel to the flow direction of the intake air within the tubular member 106 (see arrow Y1 in FIG. 13). Further, in this embodiment, the attachment portion 87 and the O-ring 89 of the first embodiment (see FIG. 5) are omitted. Here, the tubular member 106 serves as a passage wall of a part of the intake passage 12. Further, a part of the intake passage 12 within the tubular member 106 is located on the upstream side of the turbocharger 16.

According to this embodiment, the ejector housing 52 (more specifically, the body member 68) of the ejector 50 is integrated with the tubular member 106 of the intake passage 12 such that the supercharged air is discharged into the intake passage 12 on the upstream side of the turbocharger 16 and that the discharge direction of the supercharged air (see arrow Y2 in FIG. 13) is parallel to the flow direction of the intake air (see arrow Y1 in FIG. 13). Therefore, it may be possible to reduce the stress applied to the ejector housing 52 and to inhibit damage to the ejector housing 52.

Figure 16:
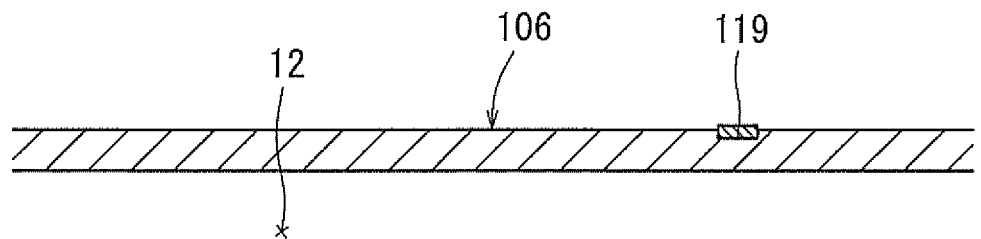
FIG. 16 is a sectional view illustrating a peripheral portion of an ejector according to a seventh embodiment.
Figure 16:
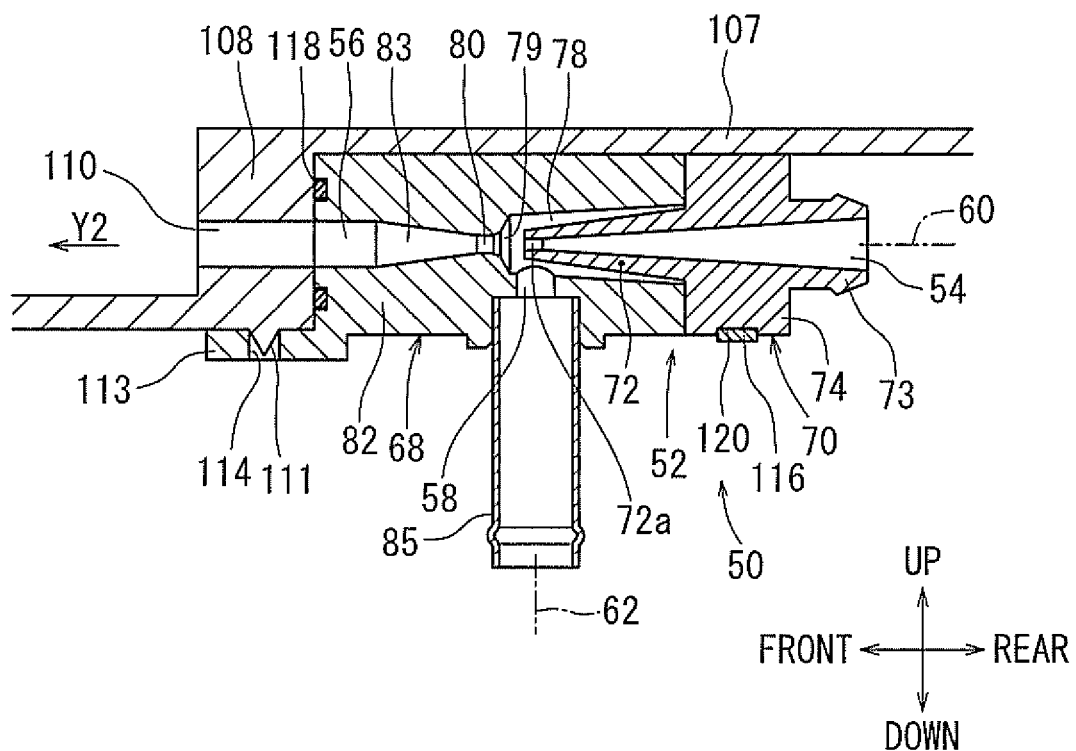

A seventh embodiment is a modification of the sixth embodiment. As shown in FIG. 16, in this embodiment, the body member 68 of the ejector 50 of the sixth embodiment (see FIG. 13) is formed as a separate member from the tubular member 106. A communication port 110 is formed in the stepped wall portion 108 of the tubular member 106 to coaxially communicate with the discharge port 56 of the body member 68. A positioning projection 111 having an inverted triangular shape protrudes from the lower side surface of the stepped wall portion 108 of the tubular member 106. A connecting piece 113 having a band-plate shape with a positioning hole 114 is formed on the lower end portion of the front end portion of the body member 68. The flange portion 74 of the nozzle member 70 is formed to have an outer contour continuous with the body member 68 and to have an increased width in the axial direction.

The ejector 50 is installed on the tubular member 106 in the following way. The ejector housing 52 (more specifically, the body member 68 and the flange portion 74 of the nozzle member 70) is fitted into the corner portion formed between the flat plate portion 107 and the stepped wall portion 108 of the tubular member 106. Further, the positioning hole 114 of the connecting piece 113 of the body member 68 engages the positioning projection 111 of the tubular member 106. In this state, the flange portion 74 of the nozzle member 70 is bundled with the tubular member 106 by a belt member 116. An O-ring 118 is interposed between the stepped wall portion 108 and the body member 68 for sealing therebetween.

A concave groove 119 is formed in the upper side surface of the tubular member 106 for fitting with the belt member 116. Further, a concave groove 120 is formed in the lower side surface of the flange portion 74 of the nozzle member 70 for fitting with the belt member 116. The belt member 116 is inhibited from displacement in the front-to-rear direction through fitting with both concave grooves 119 and 120. Here, in this embodiment, the O-ring 76 of the ejector 70 in the sixth embodiment (see FIG. 13) is omitted.

Figure 17:
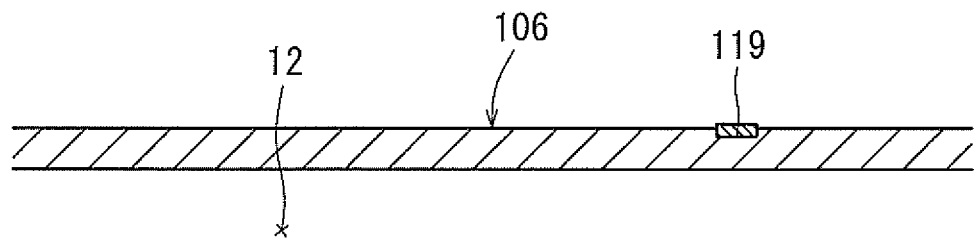
FIG. 17 is a sectional view illustrating a peripheral portion of an ejector according to an eighth embodiment.
Figure 17:
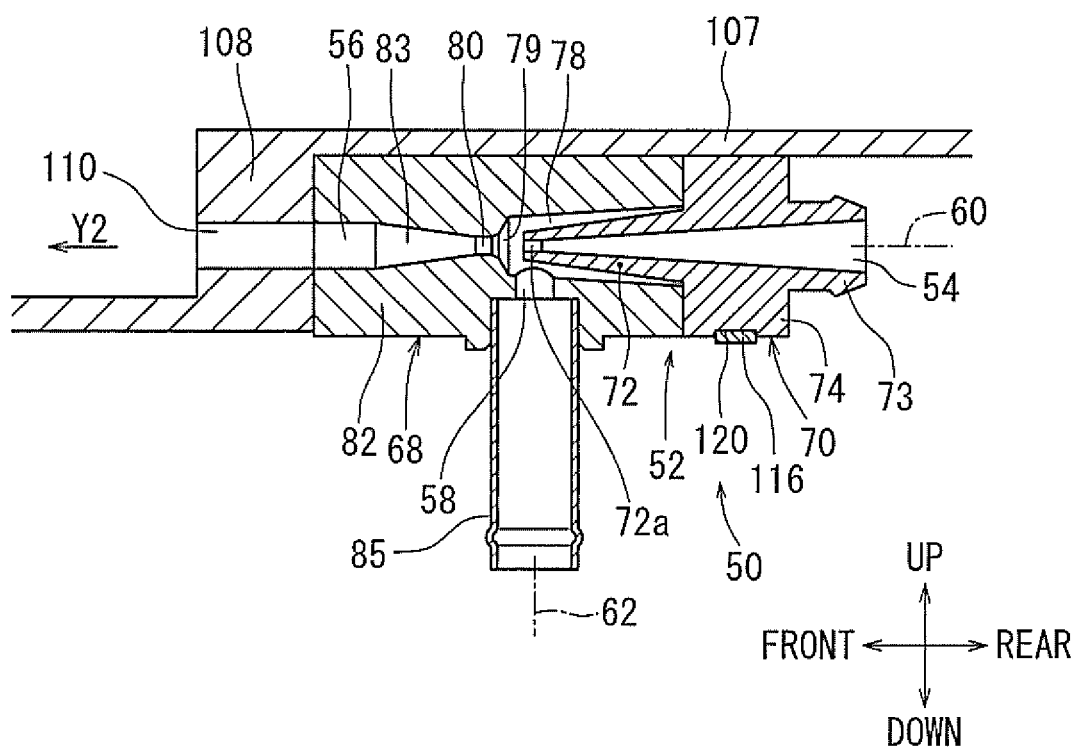

An eighth embodiment is a modification of the seventh embodiment. As shown in FIG. 17, in this embodiment, the tip end portion of the body member 68 is welded to the stepped wall portion 108 of the tubular member 106 in the seventh embodiment (see FIG. 16) throughout the entire circumference of the tip end portion. In this way, the ejector housing 52 (more specifically, the body member 68) can be integrated with the tubular member 106 of the intake passage 12 by welding. Here, the positioning projection 111 of the tubular member 106, the connecting piece 113 of the body member 68, and the O-ring 118 of the seventh embodiment (see FIG. 16) are omitted. Further, the belt member 116 may be omitted. Further, the body member 68 and/or the flange portion 74 of the nozzle member 70 may be welded to the flat plate portion 107 of the tubular member 106.

Figure 18:
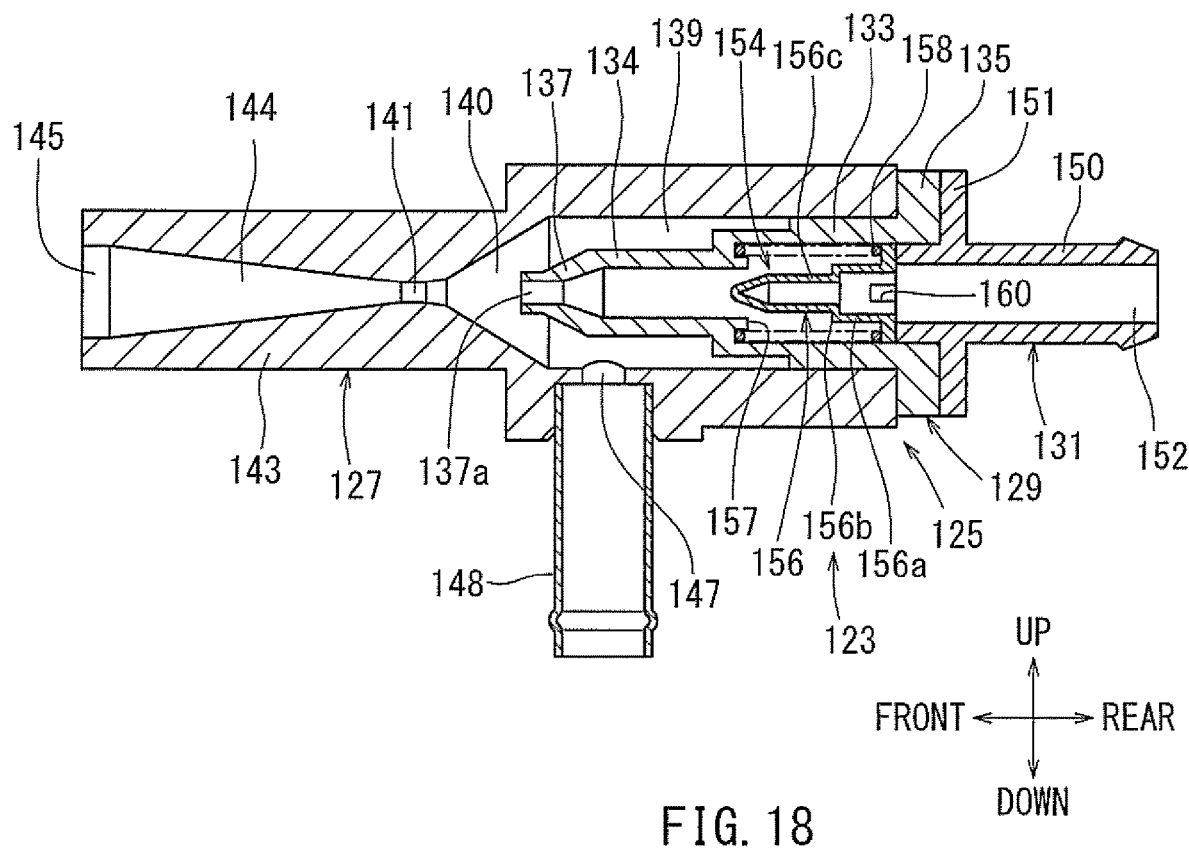
FIG. 18 is a sectional view illustrating a peripheral portion of an ejector according to a ninth embodiment.

A ninth embodiment is a modification of the ejector 50 of the first embodiment. As shown in FIG. 18, an ejector (labeled with reference numeral 123) of this embodiment is a variable-type ejector which provides a variable flow rate supplied to a nozzle member 129. The ejector 123 includes an ejector housing 125. The ejector housing 125 is provided with a resin-made body member 127, the nozzle member 129 made of resin, and a resin-made cover member 131.

The nozzle member 129 is formed to have a stepped cylindrical tube shape. The nozzle member 129 integrally includes a large-diameter tube portion 133, a small-diameter tube portion 134 coaxially continuous with the large-diameter tube portion 133 on the front side thereof, and a flange portion 135 protruding radially outward from the rear end portion of the large-diameter tube portion 133. A nozzle portion 137 having a tapered tube shape tapered toward its tip end is formed on the tip end portion (front end portion) of the small-diameter tube portion 134. An orifice portion 137a having a predetermined nozzle diameter is formed in the tip end portion (front end portion) of the nozzle portion 137.

The body member 127 is formed to have a stepped cylindrical tube shape. The nozzle member 127 is coaxially fitted into the body member 127 from the rear side. The flange portion 135 of the nozzle member 127 is welded to the rear end surface of the body member 127. A negative pressure chamber 139 having a hollow cylindrical shape surrounding the periphery of the nozzle portion 137 is formed within the body member 127. Within the front end portion of the negative pressure chamber 139, there are coaxially formed a throttle portion 140 having a tapered bore shape with an inner diameter decreasing in the downward direction, and a throat portion 141 having a cylindrical bore shape and arranged in continues with the throttle portion 140 on the downstream side thereof. A discharge pipe portion 143 is coaxially integrally formed with the front end portion of the body member 127. Within the discharge pipe portion 143, there are coaxially formed a diffuser portion 144 arranged in continuous with the downstream side of throat portion 141 and having a tapered bore shape with an inner diameter increasing in the downstream direction, and a discharge port 145 arranged in continuous with the downstream side of the diffuser portion 144. A suction port 147 is formed in the lower side portion of the body member 127 to have a hollow cylindrical shape in communication with the negative pressure chamber 139. A connection pipe 148 is connected to the suction port 147.

The cover member 131 integrally includes an introduction pipe portion 150 formed to have a hollow cylindrical shape, and a flange portion 151 protruding radially outward from the front portion of the introduction pipe portion 150. The front end portion of the introduction pipe portion 150 of the cover member 131 is coaxially fitted into rear end portion of the large-diameter tube portion 133 of the nozzle member 129. The flange portion 151 of the cover member 131 is welded to the flange portion 135 of the nozzle member 129. The inside of the introduction pipe portion 150 is configured as an introduction port 152.

A flow control valve 154 is assembled within the large-diameter tube portion 133 of the nozzle member 129 for varying the supply flow rate to the nozzle portion 137 according to the supercharged pressure (applied pressure) of the supercharged air introduced from the introduction port 152. The flow control valve 154 is provided with a valve body 156 arranged to be movable in the axial direction (front-to-rear direction) relative to and within the large-diameter tube portion 133, a valve seat portion 157 formed on the stepped portion formed between the large-diameter tube portion 133 and the small-diameter tube portion 134 of the nozzle member 129, and a spring member 158 constituted by a coil spring interposed between the nozzle member 129 and the valve body 156 for biasing the valve body 156 rearward.

The valve body 156 is formed to have a stepped hollow cylindrical tubular shape with an outer diameter decreasing in the forward direction. The valve body 156 includes a large-diameter portion 156a, a stepped portion 156b and a small-diameter portion 156c. The small-diameter portion 156c is formed to be capable of fitting into the small-diameter tube portion 134 of the nozzle member 129 while being spaced from the small-diameter tube portion 134 by a predetermined annular gap. The front end portion of the small-diameter portion 156c is closed. The rear end surface of the hollow portion within the vale body 156 is open. An opening 160 having a slit shape is formed in the rear end portion of the valve body 156 for the flow of the supercharged air from the side of the hollow portion into the annular gap formed between the nozzle member 129 and the valve body 156. Similar to the ejector 50 of the first embodiment (see FIG. 5), the body portion 127 of the ejector 123 is disposed at the tubular member 48. Here, the body member 127 serves as a housing body of the ejector 123.

With the ejector 123, if the supercharged air applied to the introduction port 152 is equal to or smaller than a predetermined value, the valve body 156 is forced to contact the introduction pipe portion 150 of the cover member 131 by the elastic force of the spring member 158, so that the flow control valve 154 is kept in a valve opening state.

Further, if the supercharged air applied to the introduction port 152 is larger than the predetermined value, the valve body 156 moves forwardly (leftward in FIG. 18) against the elastic force of the spring member 158 by the supercharged pressure (applied pressure), so that the flow control valve 154 is opened. In this case, the supercharged air flows from the opening 160 of the valve body 156 into the nozzle portion 137 via the annular gap formed between the valve body 156 and the nozzle member 129 and is eventually discharged from the discharge port 145. As a result, a predetermined negative pressure is generated at the suction port 147. Then, the fuel vapor is suctioned from the suction port 58 and is discharged to be purged together with the supercharged air from the discharge port 56 into the intake passage 12.

Figure 19:
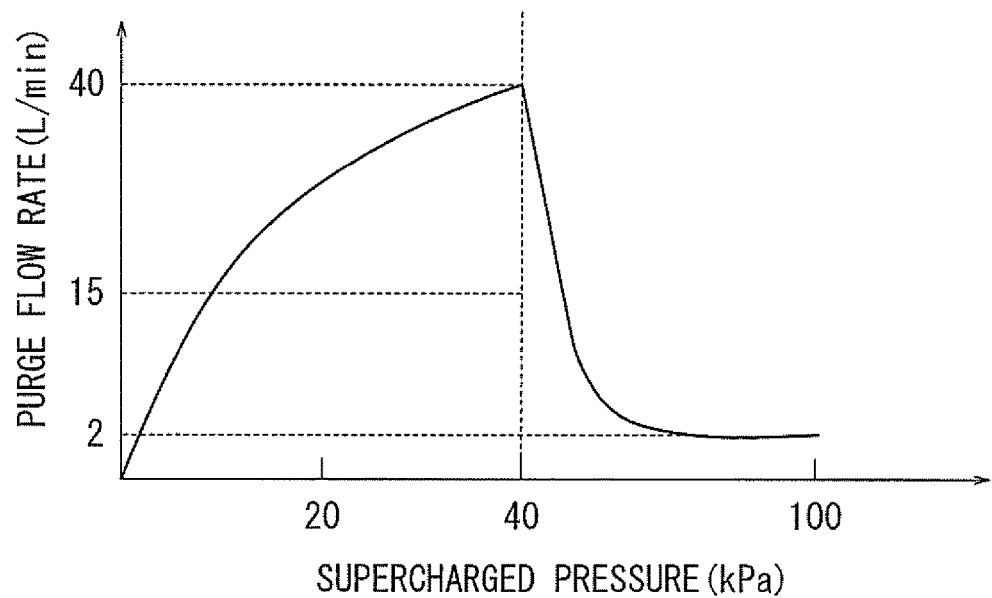
FIG. 19 is a characteristic graph illustrating the relationship between a supercharging pressure and a purge flow rate.

Further, as the supercharged pressure (applied pressure) applied to the ejector 123 increases, the supercharged air flowing though the ejector 123 increases, and at the same time, the purge flow rate of the fuel vapor increases. When the supercharged pressure exceeds a predetermined value, the stepped portion 156b of the valve body 156 contacts the valve seat portion 157 to the result that the flow control valve 154 is brought to be a closed state. FIG. 19 is a characteristic graph illustrating the relationship between the supercharged pressure and the purge flow rate.

As shown in FIG. 19, the predetermined value for the maximum supercharged pressure when the flow control valve 154 of the ejector 123 of this embodiment is opened is set, for example, to 40 (kPa). Further, setting is made such that a given amount of the purge flow rate, such as 2 (L/min), can be ensured even when the flow control valve 154 is in the closed state.

According to this embodiment, the flow control valve 154 accommodated within the ejector 123 controls the flow rate of the supercharged air flowing into the nozzle portion 137 according to the supercharged pressure (applied pressure) of the supercharged air applied to the ejector 123, and therefore, even in the range where the supercharged pressure is large, it is possible to ensure the purge flow rate of the fuel vapor. In other words, it is possible to ensure the purge flow rate of the fuel vapor over a broad range of the supercharged pressure.

Further, when the supercharged pressure applied to the ejector 123 exceeds the predetermined value, the flow control valve 154 is closed, so that it is possible to limit the purge flow rate of the fuel vapor to the given amount. Therefore, in the high supercharged range where the supercharged pressure exceeds the predetermined value, it is possible to suppress consumption of the supercharged pressure at the ejector 123. As a result, it is possible to suppress a reduction in the torque and a deterioration in the fuel consumption of the engine 10.

Further, because the flow control valve 154 is a mechanical valve, it is possible to omit an actuator, a control device, etc. that are necessary for an electrically driven flow control valve.

Further, the ejector 123 is a variable type ejector which provides a variable flow rate supplied to the nozzle member 137. Therefore, setting the nozzle diameter to be larger can increase the suctioning flow rate of the fuel vapor while decreasing the generated negative pressure. Hence, this is effective in the case where it is desired to increase the purge flow rate while reducing the system pressure loss on the purge side.

Figure 20:
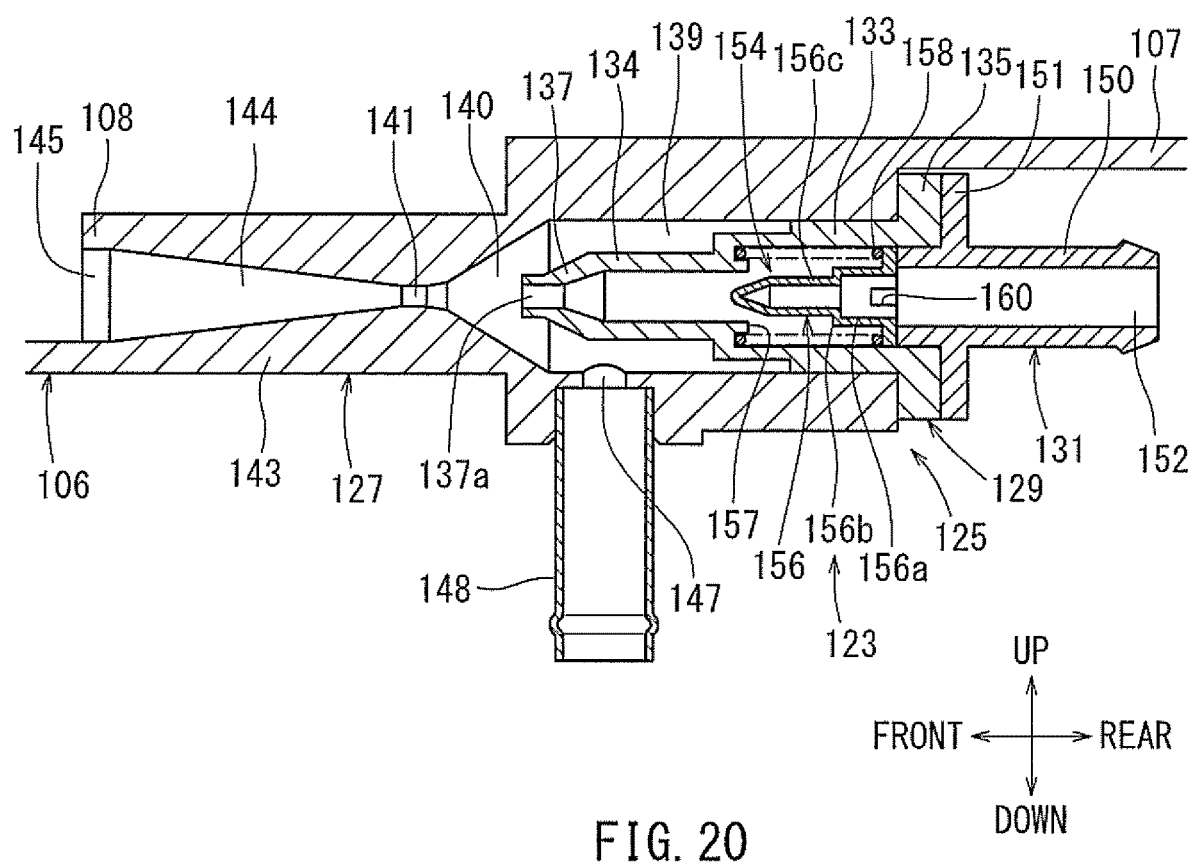
FIG. 20 is a sectional view illustrating a peripheral portion of an ejector according to a tenth embodiment.

A tenth embodiment is a modification of the sixth embodiment. As shown in FIG. 20, in this embodiment, the ejector 50 of the sixth embodiment (see FIG. 13) is replaced with the ejector 123 of the ninth embodiment (see FIG. 18). Thus, the body member 127 of the ejector 123 is disposed at the tubular member 106 in a manner similar to the ejector 50 of the sixth embodiment.

Figure 21:
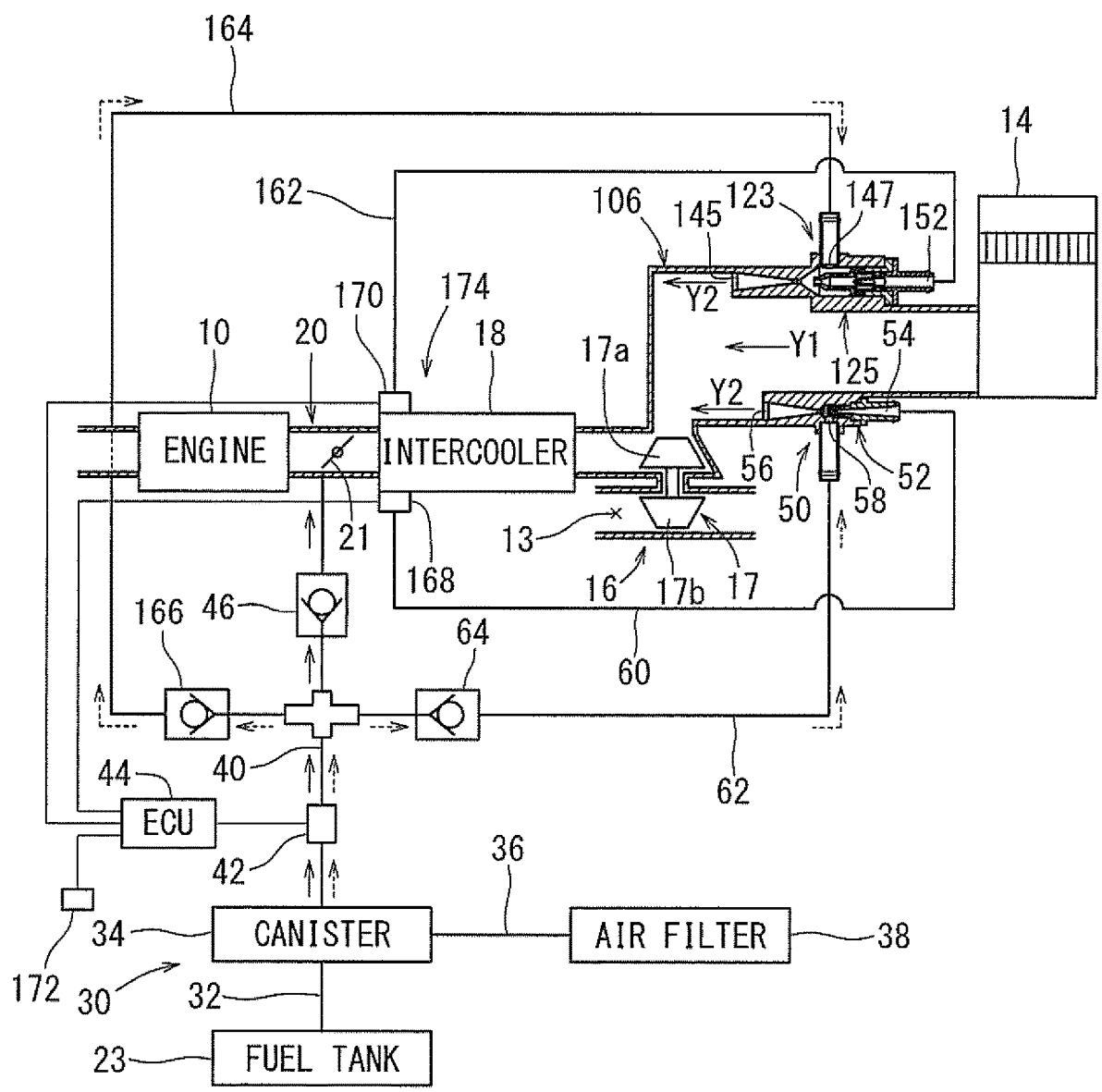
FIG. 21 is a schematic view illustrating a fuel vapor processing apparatus according to an eleventh embodiment.

An eleventh embodiment is a modification of the sixth embodiment. In this embodiment, as shown in FIG. 21, in a manner similar to the tenth embodiment, the ejector 123 of the ninth embodiment (see FIG. 18) is added to the tubular member 106 where the ejector 50 of the sixth embodiment (see FIG. 13) is disposed. Thus, different types of ejectors 50 and 123 are disposed at the tubular member 48 in a manner parallel to each other. The ejector 50 will be referred to as a first ejector 50, and the ejector 123 will be referred to as a second ejector 123. Further, the purge flow rate of the fuel vapor for the first ejector 50 may be set, for example, to 15 (L/min). A maximum purge flow rate of the fuel vapor for the second ejector 123 is set, for example, to 40 (L/min).

Another supercharged air returning passage 162 (hereinafter referred to as "a second supercharged air returning passage") is branched off from the downstream side of the compressor 17a of the turbocharger 16, such as from the intake passage 12 on the downstream side of the intercooler 18. The downstream end of the second supercharged air returning passage 162 is connected to the introduction port 152 of the second ejector 123. The supercharged air returning passage 60 connected to the introduction port 54 of the first ejector 50 will be hereinafter referred to as a first supercharged air returning passage 60. The second supercharged air returning passage 162 and the passage within the ejector 123 jointly form a bypass passage communicating between the intake passage 12 on the upstream side of the turbocharger 16 and the intake passage 12 on the downstream side of the turbocharger 16.

In addition to the purge branch passage 62 (hereinafter referred to as "a first purge branch passage 62"), another purge branch passage 164 (hereinafter called "a second purge branch passage 164") is branched off from the purge passage 40 on the downstream side of the purge valve 42, i.e., between the purge valve 42 and the purge passage check valve 46. The downstream end of the second purge branch passage 164 is connected to the suction port 147 of the second ejector 123. A second ejector check valve 166 is disposed at the second purge branch passage 164. The second ejector check valve 166 is opened by the flow of fuel vapor in the second purge branch passage 164 from the side of the purge valve 42 toward the second ejector 123, while it is closed for preventing backflow of fuel vapor. The purge branch passage 62 will be hereinafter referred to as a first purge branch passage 62. Further, the ejector check valve 64 of the first purge branch passage 62 will be hereinafter referred to as a first ejector check valve 64.

A first opening and closing valve 168 constituted by an electromagnetic valve is disposed in the first supercharged air returning passage 60 for opening and closing the same. Further, a second opening and closing valve 170 constituted by an electromagnetic valve is disposed in the second supercharged air returning passage 162 for opening and closing the same. The opening and closing valves 168 and 170 are respectively controlled to open and close by the control circuit 44. A detection signal of an intake air pressure sensor 172 detecting the intake air pressure on the downstream side of the throttle valve 21 is input to the control circuit 44. Here, the intake air pressure detected by the intake air pressure sensor 172 is equivalent to the supercharged pressure during the period in which the supercharging is made by the turbocharger 16.

When the purge passage check valve 46 is opened due to an increase of the supercharged pressure by the turbocharger 16 to a value equal to or more than a predetermined value during the operation of the engine 10, the control circuit 44 selectively opens the opening and closing valve 168 or 170 based on the intake air pressure at the throttle valve 21. Thus, selectively switching between the supercharged air returning passage 60 and 162 through which the supercharged air flows can selectively switch between the ejectors 50 and 123 to be operated. More specifically, setting is made such that the second ejector 123 is operated in the range until the intake air pressure (supercharged pressure) increases to a predetermined value (such as 40 (kPa)). Further, setting is made such that the first ejector 50 is operated in the range where the intake air pressure (supercharging pressure) exceeds the predetermined value (such as 40 (kPa)). Here, the control circuit 44 and the opening and closing valves 168 and 170 constitute a control device 174.

Figure 22:
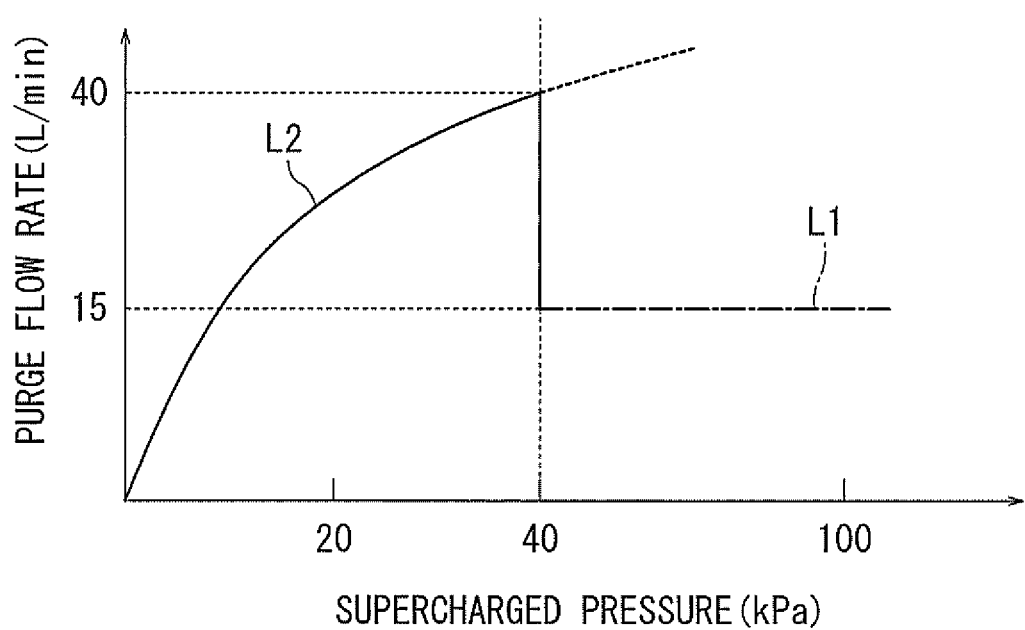
FIG. 22 is a characteristic graph illustrating the relationship between a supercharging pressure and a purge flow rate.

FIG. 22 is a characteristic graph illustrating the relationship between the supercharged pressure and the purge flow rate. As shown in FIG. 22, the characteristic in the range where the supercharged pressure does not exceed 40 (kPa) (see characteristic line L2) is achieved by the operation of the second ejector 123. The characteristic in the range where the supercharged pressure exceeds 40 (kPa) (see characteristic line L1) is achieved by the operation of the first ejector 50.

According to this embodiment, by means of the control device 174, two ejectors 50 and 123 can be selectively used based on the intake air pressure. Further, the purge amount of the fuel vapor can be increased over a broad range of the supercharged pressure. Further, it is possible to improve the lifetime of the ejectors 50 and 123. The number of kinds of ejectors may not be limited to two but may be increased to be three or more. It may be also possible to provide two or more ejectors of the same kind.

Further, the control circuit 44 may selectively switch between the ejectors 50 and 123 to be operated based on an actual air-fuel ratio in an exhaust system of the engine 10 or based on a feedback correction factor for an air-fuel ratio control.

Figure 23:
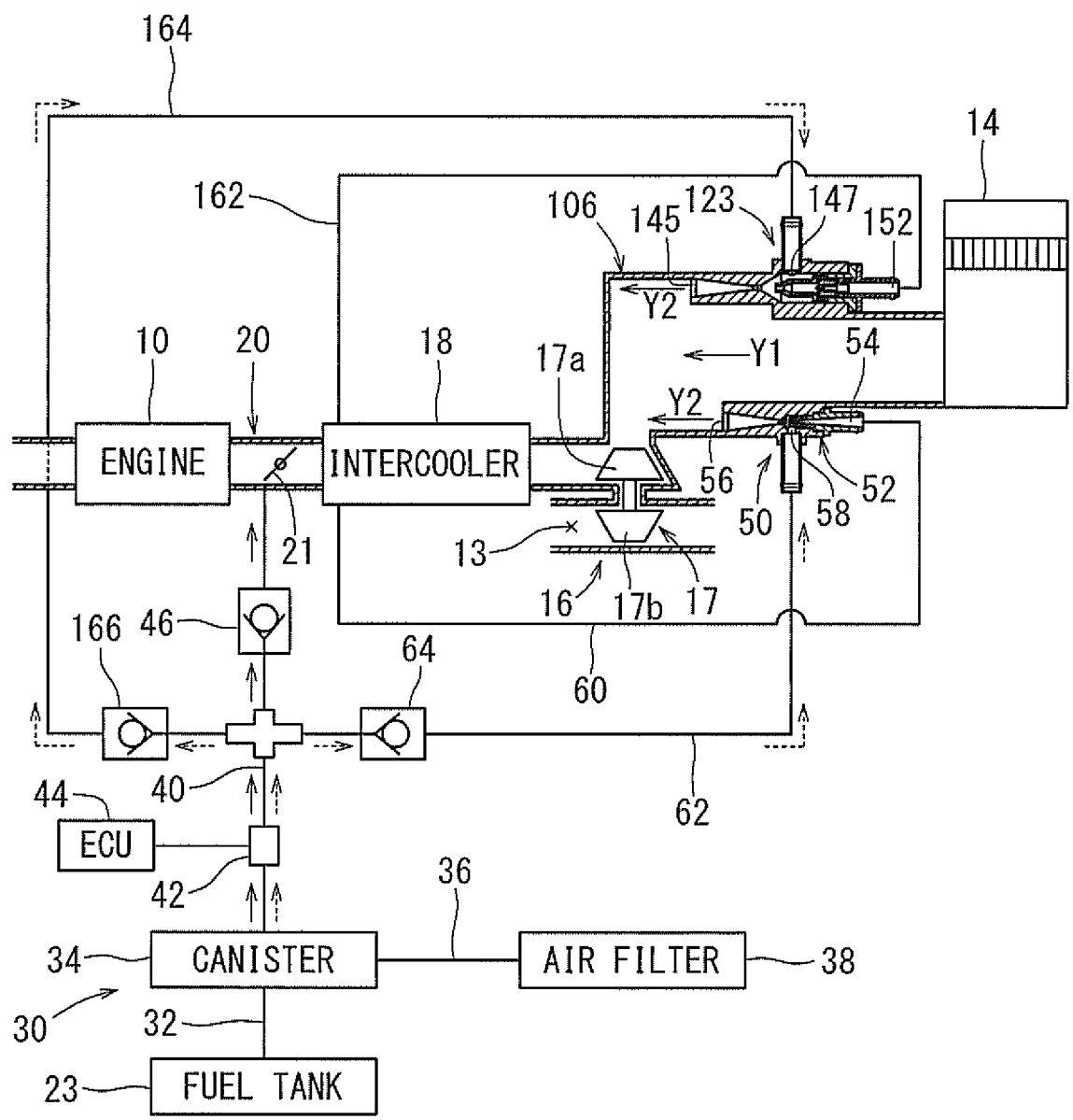
FIG. 23 is a schematic view illustrating a fuel vapor processing apparatus according to a twelfth embodiment.

A twelfth embodiment is a modification of the eleventh embodiment. As shown in FIG. 23, in this embodiment, the control device 174, i.e., the opening and closing valves 16, and 170 of the eleventh embodiment (see FIG. 21) is omitted. In addition, the maximum purge flow rate of the fuel vapor for the second ejector 123 is set, for example, to 35 (L/min). In this embodiment, switching is made between the ejectors 50 and 123 for operation according to the supercharged air.

Figure 24:
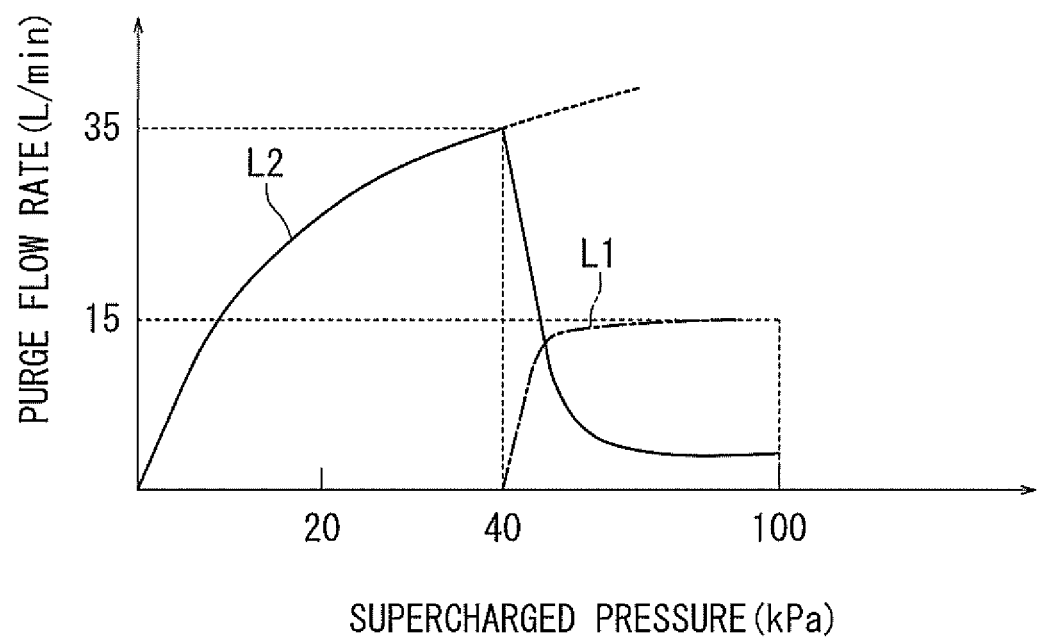
FIG. 24 is a characteristic graph illustrating the relationship between a supercharging pressure and a purge flow rate.

FIG. 24 is a characteristic graph illustrating the relationship between the supercharged pressure and the purge flow rate. As shown in FIG. 24, the characteristic in the range where the supercharged pressure does not exceed 35 (kPa) (see characteristic line L2) is achieved by the operation of the second ejector 123. The characteristic in the range where the supercharging pressure exceeds 35 (kPa) (see characteristic line L1) is achieved by the operation of the first ejector 50.

Further, in this embodiment, the ejector 123 has a smaller nozzle diameter than that of the eleventh embodiment (see FIG. 21), so that it is possible to increase a negative pressure to be generated. Therefore, it is effective in the case where the system pressure loss on the purge side is high. Here, the first ejector 50 of this embodiment may be replaced with the ejector 123 of the eleventh embodiment. Further, the number of kinds of ejectors may not be limited to two but may be increased to be three or more.

Figure 25:
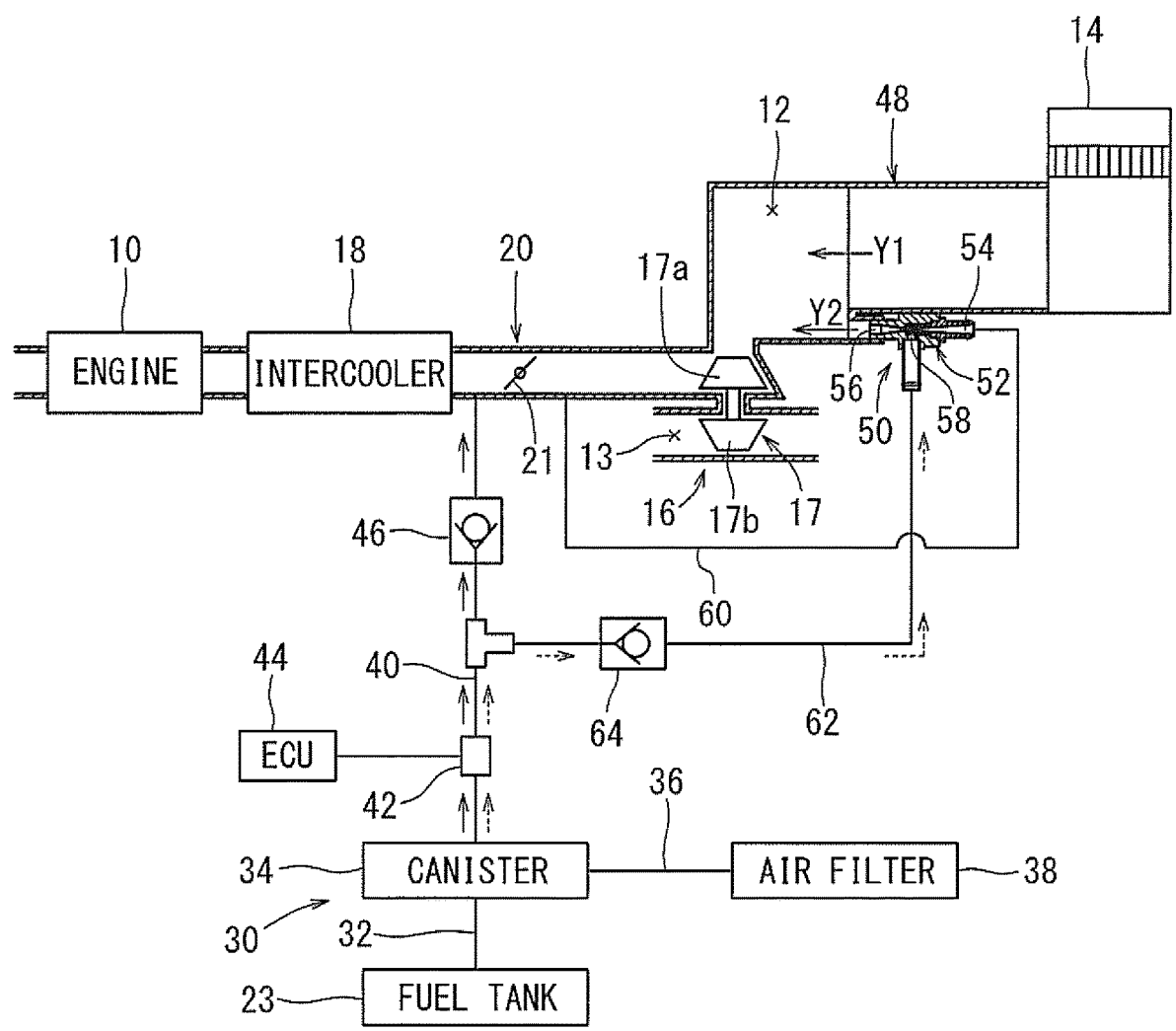
FIG. 25 is a schematic view illustrating a fuel vapor processing apparatus according to a thirteenth embodiment.

A thirteenth embodiment is a modification of the first embodiment. As shown in FIG. 25, in the fuel vapor processing apparatus 30 of this embodiment, the intercooler 18 in the first embodiment (see FIG. 1) is arranged between the throttle device 20 and the engine 10. Further, the supercharged air returning passage 60 is branched off from the intake passage 12 between the turbocharger 16 and the throttle device 20.

Figure 26:
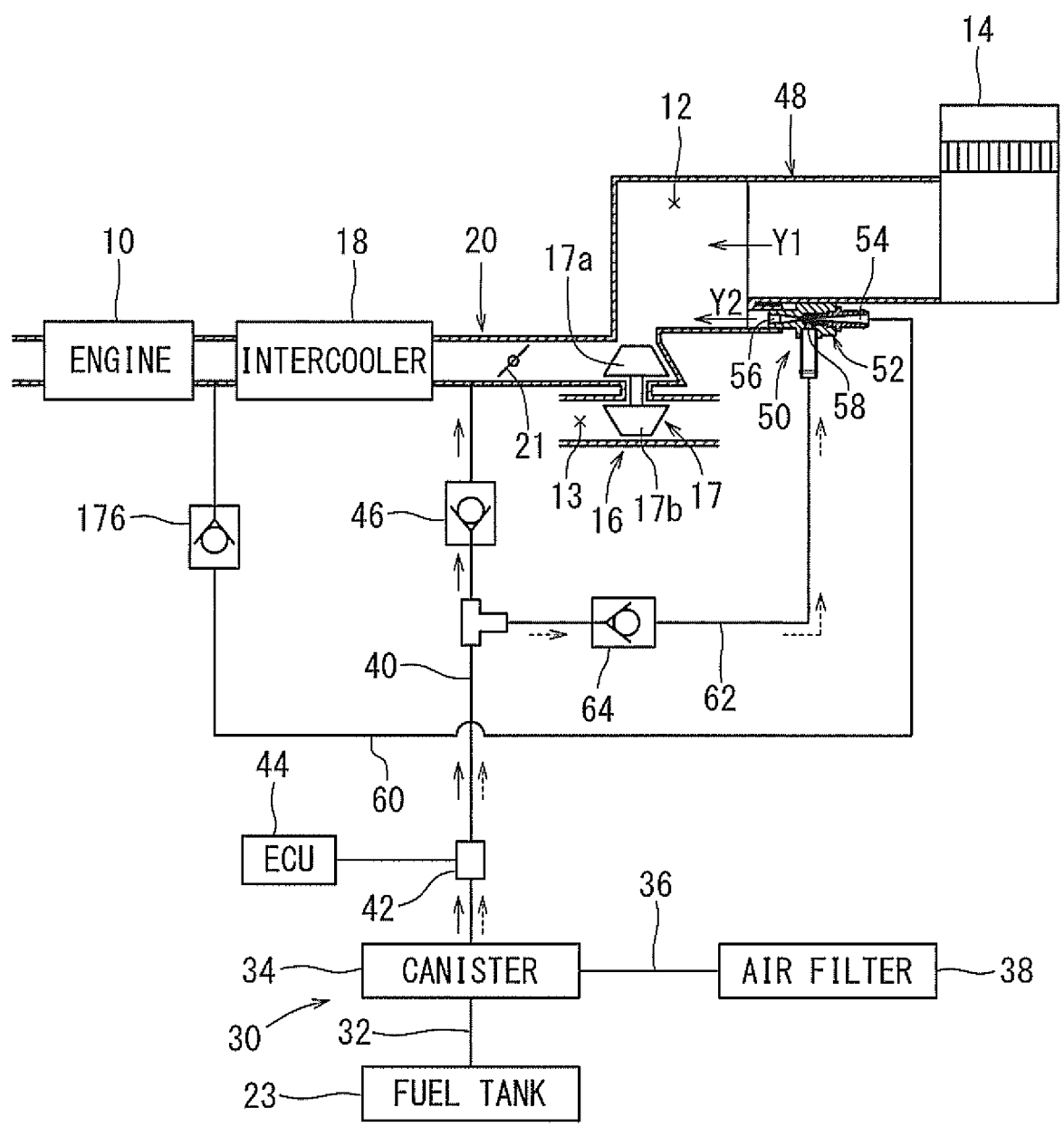
FIG. 26 is a schematic view illustrating a fuel vapor processing apparatus according to a fourteenth embodiment.

A fourteenth embodiment is a modification of the thirteenth embodiment. As shown in FIG. 26, in the fuel vapor processing apparatus 30 of this embodiment, the supercharged air returning passage 60 in the thirteenth embodiment (see FIG. 25) is branched off from the intake passage 12 between the intercooler 18 and the engine 10. A check valve 176 (hereinafter referred to as "a supercharged air returning passage check valve") is disposed at the supercharged air returning passage 60. The supercharged air returning passage check valve 176 is opened by the flow of the supercharged air from the side of the intake passage 12 toward the side of the ejector 50, while it is closed for preventing backflow of the supercharged air.

The present disclosure may not be limited to the above embodiments but may be modified without departing from the gist of the present disclosure. For example, the present disclosure may be applied to a hybrid vehicle incorporating the engine 10 and a motor. Further, the present disclosure may be applied to engines provided with turbocharges not only of the vehicles but also of ships and vessels, industrial machines, etc. Further, as a supercharging device, it may be possible to use not only the turbocharger 16 but also a supercharger, an electrically driven turbocharger, etc. Further, the discharge direction of the supercharged air from the discharge port of the ejector may be oriented in any direction. Further, the flow control valve of the ejector may not be limited to a mechanical valve but may be an electrically driven valve.

The invention claimed is:

1. A fuel vapor processing apparatus for a supercharged internal combustion engine including a supercharging device disposed in an intake passage of the engine, the fuel vapor processing apparatus comprising:
a canister configured to adsorb fuel vapor from a fuel tank; and
an ejector configured to generate a negative pressure by supercharged air flowing in the intake passage on a downstream side of the supercharging device, so that fuel vapor in the canister is purged by the negative pressure;
wherein the ejector includes an ejector housing extending in a discharge direction of the supercharged air;
wherein the ejector housing is welded to a passage wall of the intake passage such that the supercharged air is discharged into the intake passage on the downstream side of the supercharging device and that the discharge direction of the supercharged air is parallel to a direction of flow of intake air;
wherein the ejector housing includes an introduction port for the supercharged air; and
wherein the introduction port is disposed within the intake passage.

2. A fuel vapor processing apparatus for a supercharged internal combustion engine including a supercharging device disposed in an intake passage of the engine, the fuel vapor processing apparatus comprising:
a canister configured to adsorb fuel vapor from a fuel tank; and
an ejector configured to generate a negative pressure by supercharged air flowing in the intake passage on a downstream side of the supercharging device, so that fuel vapor in the canister is purged by the negative pressure;
wherein an ejector housing of the ejector includes a discharge port for the supercharged air;
wherein the ejector housing is formed integrally with a passage wall of the intake passage such that the supercharged air is discharged from the discharge port into the intake passage on the downstream side of the supercharging device;
wherein the ejector housing includes an introduction port for the supercharged air; and
wherein the introduction port is disposed within the intake passage.

3. The fuel vapor processing apparatus according to claim 2, wherein:
the ejector housing is oriented such that a discharge direction of the supercharged air from the discharge port is at an acute angle to a direction of flow of intake air within the passage wall.

4. A fuel vapor processing apparatus for a supercharged internal combustion engine including a supercharging device disposed in an intake passage of the engine, the fuel vapor processing apparatus comprising:
a canister configured to adsorb fuel vapor from a fuel tank;
an ejector configured to generate a negative pressure by supercharged air produced by the supercharging device, so that fuel vapor in the canister is purged by the negative pressure; and
a flow control valve disposed in the ejector, wherein;
the ejector is disposed in a portion of the intake passage on a downstream side of the supercharging device;
the flow control valve includes a spring biases a valve body of the flow control valve in a valve opening direction with a biasing force; and
the flow control valve is configured to control a flow rate of supercharged air flowing into a nozzle portion of the ejector according to both a supercharging pressure of the supercharged air and the biasing force of the spring.

5. A fuel vapor processing apparatus for a supercharged internal combustion engine including a supercharging device disposed in an intake passage of the engine, the fuel vapor processing apparatus comprising:
a canister configured to adsorb fuel vapor from a fuel tank; and
an ejector configured to generate a negative pressure by supercharged air flowing in the intake passage on a downstream side of the supercharging device, so that fuel vapor in the canister is purged by the negative pressure;

wherein an ejector housing of the ejector is integrated with a passage wall of the intake passage such that the supercharged air is discharged into the intake passage on the downstream side of the supercharging device and that the discharge direction of the supercharged air is parallel to a direction of flow of intake air;

wherein the ejector housing includes an introduction port for the supercharged air; and wherein the introduction port is disposed within the intake passage.

6. The fuel vapor processing apparatus according to claim 5, wherein:

the ejector housing of the ejector includes a discharge port for the supercharged air; and the ejector housing is welded to the passage wall of the intake passage.

7. The fuel vapor processing apparatus according to claim 1, further comprising a flow control valve, wherein:

the flow control valve is accommodated in the ejector and is configured to control a flow rate of supercharged air flowing into a nozzle portion of the ejector according to a supercharging pressure of the supercharged air.

8. The fuel vapor processing apparatus according to claim 1, wherein:

the fuel vapor processing apparatus comprises a plurality of ejectors disposed at the passage wall and oriented parallel to each other.

9. The fuel vapor processing apparatus according to claim 8, further comprising a control device configured to selectively switch the ejector to be operated between the plurality of ejectors based on an intake air pressure.

10. The fuel vapor processing apparatus according to claim 8, further comprising a control device configured to selectively switch the ejector to be operated between the plurality of ejectors based on an actual air-fuel ratio in an exhaust system of the internal combustion engine or based on a feedback correction factor for an air-fuel ratio control.

11. The fuel vapor processing apparatus according to claim 2, further comprising a flow control valve, wherein:

the flow control valve is disposed in the ejector and is configured to control a flow rate of supercharged air flowing into a nozzle portion of the ejector according to a supercharging pressure of the supercharged air.

12. The fuel vapor processing apparatus according to claim 2, wherein:

the fuel vapor processing apparatus comprises a plurality of ejectors disposed at the passage wall and oriented parallel to each other.

13. The fuel vapor processing apparatus according to claim 12, further comprising a control device configured to selectively switch the ejector to be operated between the plurality of ejectors based on an intake air pressure.

14. The fuel vapor processing apparatus according to claim 12, further comprising a control device configured to selectively switch the ejector to be operated between the plurality of ejectors based on an actual air-fuel ratio in an exhaust system of the internal combustion engine or based on a feedback correction factor for an air-fuel ratio control.

15. The fuel vapor processing apparatus according to claim 4, wherein:

the fuel vapor processing apparatus comprises a plurality of ejectors disposed at the passage wall and oriented parallel to each other.

16. The fuel vapor processing apparatus according to claim 15, further comprising a control device configured to selectively switch the ejector to be operated between the plurality of ejectors based on an intake air pressure.

17. The fuel vapor processing apparatus according to claim 15, further comprising a control device configured to selectively switch the ejector to be operated between the plurality of ejectors based on an actual air-fuel ratio in an exhaust system of the internal combustion engine or based on a feedback correction factor for an air-fuel ratio control.

18. The fuel vapor processing apparatus according to claim 5, further comprising a flow control valve, wherein:

the flow control valve is disposed in the ejector and is configured to control a flow rate of supercharged air flowing into a nozzle portion of the ejector according to a supercharging pressure of the supercharged air.

19. The fuel vapor processing apparatus according to claim 5, wherein:

the fuel vapor processing apparatus comprises a plurality of ejectors disposed at the passage wall and oriented parallel to each other.

20. The fuel vapor processing apparatus according to claim 19, further comprising a control device configured to selectively switch the ejector to be operated between the plurality of ejectors based on an intake air pressure.

21. The fuel vapor processing apparatus according to claim 19, further comprising a control device configured to selectively switch the ejector to be operated between the plurality of ejectors based on an actual air-fuel ratio in an exhaust system of the internal combustion engine or based on a feedback correction factor for an air-fuel ratio control.

* * * * *